US011563235B2

(12) United States Patent
Mochizuki et al.

(10) Patent No.: US 11,563,235 B2
(45) Date of Patent: Jan. 24, 2023

(54) SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, METHOD OF MANUFACTURING SHEET FOR ALL-SOLID STATE SECONDARY BATTERY, AND METHOD OF MANUFACTURING ALL-SOLID STATE SECONDARY BATTERY

(71) Applicant: FUJIFILM Corporation, Tokyo (JP)

(72) Inventors: Hiroaki Mochizuki, Kanagawa (JP); Masaomi Makino, Kanagawa (JP); Tomonori Mimura, Kanagawa (JP); Yo Kushida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 151 days.

(21) Appl. No.: 16/846,428

(22) Filed: Apr. 13, 2020

(65) Prior Publication Data

US 2020/0243904 A1    Jul. 30, 2020

Related U.S. Application Data

(63) Continuation of application No. PCT/JP2018/040262, filed on Oct. 30, 2018.

(30) Foreign Application Priority Data

Nov. 17, 2017  (JP) .............................. JP2017-221840

(51) Int. Cl.
| | | |
|---|---|---|
| *H01M 10/0562* | (2010.01) | |
| *H01M 4/62* | (2006.01) | |
| *H01M 10/0525* | (2010.01) | |
| *H01M 10/0565* | (2010.01) | |
| *H01M 4/02* | (2006.01) | |
| *H01M 4/1391* | (2010.01) | |
| *H01M 4/1395* | (2010.01) | |
| *H01M 4/1397* | (2010.01) | |
| *H01M 4/60* | (2006.01) | |
| *H01M 4/66* | (2006.01) | |

(52) U.S. Cl.
CPC ..... *H01M 10/0562* (2013.01); *H01M 4/1391* (2013.01); *H01M 4/1395* (2013.01); *H01M 4/1397* (2013.01); *H01M 4/608* (2013.01); *H01M 4/622* (2013.01); *H01M 4/667* (2013.01); *H01M 10/0525* (2013.01); *H01M 10/0565* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 9,276,263 B2 | 3/2016 | Yoshida et al. | |
| 2016/0204465 A1 | 7/2016 | Mimura et al. | |
| 2016/0336613 A1* | 11/2016 | Mochizuki | ............. H01B 1/122 |
| 2017/0301950 A1* | 10/2017 | Mimura | ................. H01M 4/661 |
| 2018/0062162 A1* | 3/2018 | Maeda | .................. H01M 4/364 |

FOREIGN PATENT DOCUMENTS

| | | |
|---|---|---|
| JP | 2003197030 | 7/2003 |
| JP | 2006351448 | 12/2006 |
| JP | 2015088486 | 5/2015 |
| JP | 2016149238 | 8/2016 |
| WO | 2012173089 | 12/2012 |
| WO | 2016136983 | 9/2016 |
| WO | WO 2016/152262 | * 9/2016 |

OTHER PUBLICATIONS

Poly(lauryl methacrylate) solution, Millipore Sigma, date unknown.*
Poly(octadecyl methacrylate) solution, Millipore Sigma, date unknown.*
"International Search Report (Form PCT/ISA/210) of PCT/JP2018/040262," dated Dec. 4, 2018, with English translation thereof, pp. 1-5.
"Written Opinion of the International Searching Authority (Form PCT/ISA/237) of PCT/JP2018/040262," dated Dec. 4, 2018, with English translation thereof, pp. 1-9.
"Office Action of China Counterpart Application" with English translation thereof, dated Oct. 19, 2022, p. 1-p. 12.

* cited by examiner

*Primary Examiner* — Anca Eoff
(74) *Attorney, Agent, or Firm* — JCIPRNET

(57) ABSTRACT

A solid electrolyte composition includes: an inorganic solid electrolyte; binder particles having an average particle size of 1 nm to 10 μm; and a dispersion medium, in which the binder particles include a polymer that includes a component derived from a polymerizable compound having a molecular weight of lower than 1,000, and the component includes at least one of an aliphatic hydrocarbon chain to which 10 or more carbon atoms are bonded or a siloxane structure as a side chain of the polymer. The solid electrolyte composition is used in the sheet for an all-solid state secondary battery, the electrode sheet for an all-solid state secondary battery, the all-solid state secondary battery, the method of manufacturing a sheet for an all-solid state secondary battery, and the method of manufacturing an all-solid state secondary battery.

14 Claims, 1 Drawing Sheet

SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, METHOD OF MANUFACTURING SHEET FOR ALL-SOLID STATE SECONDARY BATTERY, AND METHOD OF MANUFACTURING ALL-SOLID STATE SECONDARY BATTERY

CROSS-REFERENCE TO RELATED APPLICATIONS

This application is a Continuation of PCT International Application No. PCT/JP2018/040262 filed on Oct. 30, 2018, which claims priority under 35 U.S.C § 119(a) to Japanese Patent Application No. 2017-221840 filed on Nov. 17, 2017. Each of the above application(s) is hereby expressly incorporated by reference, in its entirety, into the present application.

BACKGROUND OF THE INVENTION

1. Field of the Invention

The present invention relates to a solid electrolyte composition, a sheet for an all-solid state secondary battery, an electrode sheet for an all-solid state secondary battery, an all-solid state secondary battery, a method of manufacturing a sheet for an all-solid state secondary battery, and a method of manufacturing an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in reliability and safety.

Under these circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety or reliability which is considered as a problem of batteries in which the organic electrolytic solution is used can be significantly improved, and it also becomes possible to extend the service lives. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

A configuration is disclosed in which, in the all-solid state secondary battery, any one of an active material layer of a negative electrode, a solid electrolyte layer, or an active material layer of a positive electrode is formed of a material including an inorganic solid electrolyte or an active material and binder particles (binder) such as a specific polymer compound. For example, JP2015-088486A describes a solid electrolyte composition including: an inorganic solid electrolyte; binder particles having an average particle size of 10 nm to 1,000 nm that is formed of a polymer incorporated with a macromonomer having a number-average molecular weight of 1,000 or higher as a side chain component; and a dispersion medium. JP2016-149238A describes a solid electrolyte composition including: an inorganic solid electrolyte; a specific active material; and a specific particle polymer. As the specific particle polymer, specifically, a polymer that includes a repeating unit having a siloxane structure incorporated into a main chain or a polymer incorporated with a macromonomer having a number-average molecular weight of 1,000 or higher is described. Further, WO2012/173089A describes a composition (slurry) including: an inorganic solid electrolyte; a binder that is formed of a particle polymer having a core-shell structure in which nonylphenoxy polyethylene glycol acrylate is used as a monomer; and a nonpolar solvent.

SUMMARY OF THE INVENTION

Constituent layers (an inorganic solid electrolyte layer and an active material layer) in an all-solid state secondary battery are typically formed of an inorganic solid electrolyte, optionally an active material or a conductive auxiliary agent, and further binder particles. Therefore, interface contact between solid particles (for example, an inorganic solid electrolyte, solid particles, or a conductive auxiliary agent) is insufficient, and interface resistance increases. On the other hand, in a case where binding properties of binder particles between solid particles are weak, poor contact between the solid particles occurs, which causes a deterioration in battery performance.

However, recently, the development of an all-solid state secondary battery has rapidly progressed, battery performance required for an all-solid state secondary battery has also increased, and it has been desired to simultaneously achieve a reduction in interface resistance and improvement of binding properties on a higher level.

An object of the present invention is to provide a solid electrolyte composition. In an all-solid state secondary battery that is formed using this solid electrolyte composition as a material for forming a constituent layer in an all-solid state secondary battery, an increase in interface resistance between solid particles can be suppressed, and strong binding properties can also be realized. In addition, another object of the present invention is to provide a sheet for an all-solid state secondary battery, an electrode sheet for an all-solid state secondary battery, and an all-solid state secondary battery that are formed of the solid electrolyte composition, a method of manufacturing a sheet for an all-solid state secondary battery, and a method of manufacturing an all-solid state secondary battery.

The present inventors repeatedly conducted a thorough investigation and found that a solid electrolyte composition in which binder particles having a specific particle size formed of a polymer are dispersed in a dispersion medium in combination with solid particles exhibits high dispersion stability, the polymer being obtained by polymerization of a specific polymerizable compound and having a side chain into which a chain structure (aliphatic hydrocarbon chain) formed of aliphatic hydrocarbon having 10 or more carbon atoms or a siloxane structure is introduced. Further it was also found that, by using this solid electrolyte composition as a material for forming a constituent layer in an all-solid state secondary battery, solid particles can be strongly bonded to each other while suppressing interface resistance between the solid particles can be formed, and excellent battery performance can be imparted to the all-solid state secondary battery. The present invention has been completed based on the above findings as a result of repeated investigation.

That is, the above-described objects have been achieved by the following means.

<1> A solid electrolyte composition comprising:
an inorganic solid electrolyte having ion conductivity of a metal belonging to Group 1 or Group 2 in the periodic table;
binder particles having an average particle size of 1 nm to 400 nm; and
a dispersion medium,
in which the binder particles include a polymer that includes a component derived from a polymerizable compound having a molecular weight of lower than 1,000, and
the component includes at least one of an aliphatic hydrocarbon chain to which 10 or more carbon atoms are bonded or a siloxane structure as a side chain of the polymer.

<2> The solid electrolyte composition according to <1>, in which the polymer includes a component having a SP value of 10.5 $(cal^{1/2} cm^{-3/2})$ or higher.

<3> The solid electrolyte composition according to <1> or <2>,
in which a content of the component derived from the polymerizable compound with respect to the polymer is 0.1 to 70 mass %.

<4> The solid electrolyte composition according to any one of <1> to <3>,
in which a glass transition temperature of the polymer is 30° C. or lower.

<5> The solid electrolyte composition according to any one of <1> to <4>,
in which the aliphatic hydrocarbon chain is linear.

<6> The solid electrolyte composition according to any one of <1> to <5>,
in which the component derived from the polymerizable compound has at least one chain structure represented by the following Formula (HC) as the aliphatic hydrocarbon chain, Formula (HC)

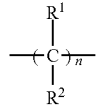

where in Formula (HC), $R^1$ and $R^2$ each independently represent a hydrogen atom, a halogen atom, a cyano group, an alkyl group, an alkoxy group, or an aryl group, and
n represents an integer of 10 or more.

<7> The solid electrolyte composition according to any one of <1> to <6>,
in which the polymer includes at least one functional group selected from the following group of functional groups,
<Group of Functional Groups>
an acidic functional group, a basic functional group, a hydroxy group, a cyano group, an alkoxysilyl group, an aryl group, a heteroaryl group, and a hydrocarbon ring group in which three or more rings are fused.

<8> The solid electrolyte composition according to any one of <1> to <7>, in which the inorganic solid electrolyte is a sulfide-based inorganic solid electrolyte.

<9> The solid electrolyte composition according to any one of <1> to <8>, further comprising:
an active material.

<10> The solid electrolyte composition according to any one of <1> to <9>,
in which a content of the component derived from the polymerizable compound with respect to the polymer is 0.5 to 50 mass %.

<11> A sheet for an all-solid state battery comprising:
a layer that is formed of the solid electrolyte composition according to any one of <1> to <10>.

<12> An electrode sheet for an all-solid state battery comprising:
an active material layer that is formed of the solid electrolyte composition according to <9>.

<13> An all-solid state secondary battery comprising a positive electrode active material layer, a solid electrolyte layer, and a negative electrode active material layer in this order,
in which at least one of the positive electrode active material layer, the solid electrolyte layer, or the negative electrode active material layer is formed of the solid electrolyte composition according to any one of <1> to <10>.

<14> A method of manufacturing a sheet for an all-solid state secondary battery comprising forming a film using the solid electrolyte composition according to any one of <1> to <10>.

<15> A method of manufacturing an all-solid state secondary battery comprising manufacturing an all-solid state secondary battery using the method according to <14>.

In a case where the solid electrolyte composition according to the present invention is used as a material of a constituent layer in a sheet for an all-solid state secondary battery or an all-solid state secondary battery, an increase in interface resistance between the solid particles is effectively suppressed, and a sheet or a constituent layer in which solid particles are strongly bonded to each other can be formed. The sheet for an all-solid state secondary battery according to the present invention exhibits low resistance and strong binding properties. The all-solid state secondary battery according to the present invention exhibits low resistance and excellent battery performance. In addition, in the method of manufacturing a sheet for an all-solid state secondary battery and the method of manufacturing an all-solid state secondary battery, the sheet for an all-solid state secondary battery and the all-solid state secondary battery according to the present invention having the above-described excellent characteristics can be manufactured.

DESCRIPTION OF THE PREFERRED EMBODIMENTS

Figure 1:
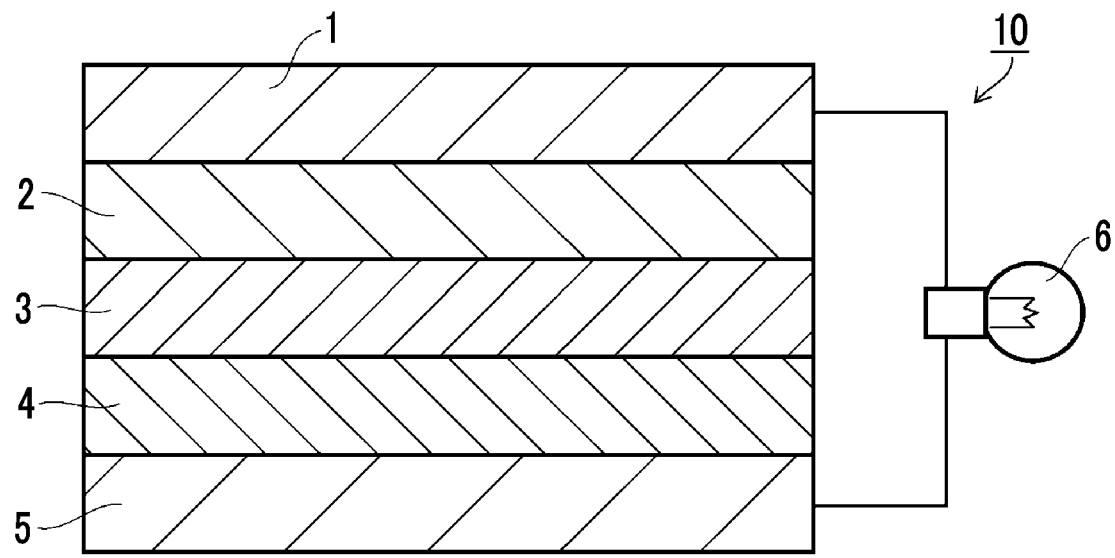
FIG. 1 is a vertical cross-sectional view schematically illustrating an all-solid state secondary battery according to a preferred embodiment of the present invention.

In the present specification, numerical ranges represented by "to" include numerical values before and after "to" as lower limit values and upper limit values.

In the description of the present specification, "(meth) acryl" or "(meth)acryl) refers to acryl and/or methacryl.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where desired effects are exhibited.

A substituent (the same shall be applied to a linking group) which is not specified in the present specification regarding whether to be substituted or unsubstituted may have an appropriate substituent. The same shall be applied to a compound which is not specified in the present specification regarding whether to be substituted or unsubstituted. Preferable examples of the substituent include a substituent Z described below.

In addition, in a case where a YYY group is simply described in the present specification, the YYY group may further have a substituent.

[Solid Electrolyte Composition]

A solid electrolyte composition according to an embodiment of the present invention comprises: an inorganic solid electrolyte having ion conductivity of a metal belonging to Group 1 or Group 2 in the periodic table; binder particles having an average particle size of 1 nm to 10 μm; and a dispersion medium. The binder particles include a polymer that includes a component (also referred to as "specific component") derived from a polymerizable compound having a molecular weight of lower than 1,000. The component derived from the polymerizable compound includes at least one of an aliphatic hydrocarbon chain to which 10 or more carbon atoms are bonded or a siloxane structure as a side chain of the polymer.

An aspect (mixed aspect) in which the solid electrolyte composition according to the embodiment of the present invention includes the inorganic solid electrolyte, the binder particles, and the dispersion medium is not particularly limited and is preferably a slurry in which the inorganic solid electrolyte and the binder particles are dispersed in the dispersion medium.

In a case where the solid electrolyte composition according to the embodiment of the present invention is the slurry, the solid particles of the inorganic solid electrolyte and the active material, the conductive auxiliary agent, and the like that are used in combination can be favorably dispersed. Further, layer separation caused by aggregation, precipitation, or the like of the solid particle and further an unreacted compound or the like can be effectively suppressed, and a homogeneous composition (dispersed state) can be maintained (high dispersion stability can be exhibited).

The polymer forming the binder particles having an average particle size of 1 nm to 10 μm includes the component derived from the polymerizable compound having a molecular weight of lower than 1,000 and has, as a side chain, the aliphatic hydrocarbon chain to which 10 or more carbon atoms are bonded or the siloxane structure that includes the component. Therefore, the binder particles formed of the polymer including the specific component can allow the solid particles used in combination to be highly and stably dispersed in the dispersion medium due to the synergistic effect of the average particle size, the aliphatic hydrocarbon chain or the siloxane structure as the side chain of the polymer, and the molecular weight of the polymerizable compound that derives the component forming the side chain. In addition, in a case where a sheet for an all-solid state secondary battery or a constituent layer in an all-solid state secondary battery is formed using the solid electrolyte composition, strong binding between the solid particles and low resistance achieved by good contact between the solid particles are exhibited with a good balance. The significance for defining the average particle size, the aliphatic hydrocarbon chain or the siloxane structure, and the molecular weight of the polymerizable compound described above will be described below.

It is preferable that the solid electrolyte composition according to the embodiment of the present invention is used as a molding material a sheet for an all-solid state secondary battery or a solid electrolyte layer or an active material layer in an all-solid state secondary battery.

The moisture content (also referred to as "water content") in the solid electrolyte composition according to the embodiment of the present invention is not particularly limited and is preferably 500 ppm or lower, more preferably 200 ppm or lower, still more preferably 100 ppm or lower, and still more preferably 50 ppm or lower. In a case where the moisture content of the solid electrolyte composition is low, deterioration of the inorganic solid electrolyte can be suppressed. The moisture content refers to the amount of water (the mass ratio thereof to the solid electrolyte composition) in the solid electrolyte composition and specifically is a value obtained by Karl Fischer titration after filtering the solid electrolyte composition the through a membrane filter having a pore size of 0.02 μm.

Hereinafter, the components that are included in the solid electrolyte composition according to the embodiment of the present invention and components that may be included therein will be described.

<Inorganic Solid Electrolyte>

The solid electrolyte composition according to the embodiment of the present invention includes an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic substance as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has ion conductivity of a metal belonging to Group 1 or Group 2 in the periodic table and generally does not have electron conductivity. In a case where an all-solid state secondary battery according to the embodiment of the present invention is a lithium ion battery, the inorganic solid electrolyte preferably has ion conductivity of lithium ions.

The inorganic solid electrolyte can be appropriately selected from solid electrolyte materials that are typically used for an all-solid state secondary battery. Representative examples of the inorganic solid electrolyte include (i) a sulfide-based inorganic solid electrolyte and (ii) an oxide-based inorganic solid electrolyte. In the present invention, from the viewpoint that a more favorable interface can be formed between the active material and the inorganic solid electrolyte, a sulfide-based inorganic solid electrolyte is preferably used.

(i) Sulfide-Based Inorganic Solid Electrolyte

The sulfide-based inorganic solid electrolyte is preferably a compound that contains a sulfur atom (S), has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by the following Formula (1).

  (1)

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphoruspentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom (O), has ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited, but realistically $1\times10^{-1}$ S/cm or less.

Specific examples of the compound include: $Li_{xa}La_{ya}TiO_3$ [xa satisfies $0.3 \leq xa \leq 0.7$ and ya satisfies $0.3 \leq ya \leq 0.7$] (LLT); $Li_{xb}La_{yb}Zr_{zb}M^{bb}{}_{mb}O_{nb}$ ($M^{bb}$ represents at least one element selected from Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}{}_{zc}O_{nc}$ ($M^{cc}$ represents at least one element selected from C, S, Al, Si, Ga, Ge, In, or Sn, xc satisfies $0 \leq xc \leq 5$, yc satisfies $0 \leq yc \leq 1$, zc satisfies $0 \leq zc \leq 1$, and nc satisfies $0 \leq nc \leq 6$); $Li_{xd}(Al,Ga)_{yd}(Ti,Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}{}_{xe}D^{ee}O$ (xe represents a number of 0 to 0.1, $M^{ee}$ represents a divalent metal atom, and $D^{ee}$ represents a halogen atom or a combination of two or more halogen atoms); $Li_{xf}Si_{yf}O_{zf}$ (xf satisfies $1 \leq xf \leq 5$, yf satisfies $0 \leq yf \leq 3$, and zf satisfies $1 \leq zf \leq 10$); $Li_{xg}S_{yg}O_{zg}$ (xg satisfies $1 \leq xg \leq 3$, yg satisfies $0 \leq yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$-$SaO_2$, $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al,Ga)_{xh}(Ti,Ge)_{2-xh}Si_{yh}P_{3-yh}O_{12}$ (xh represents $0 \leq xh \leq 1$, and yh represents $0 \leq yh \leq 1$); and $Li_7La_3Zr_2O_{12}$ (LLZ) having a garnet-type crystal structure.

In addition, a phosphorus compound including Li, P, and O is also desirable. Examples of the phosphorus compound include: lithium phosphate ($Li_3PO_4$); LiPON in which some of oxygen atoms in lithium phosphate are substituted with nitrogen atoms; and $LiPOD^1$ ($D^1$ preferably represents one or more elements selected from Ti, V, Cr, Mn, Fe, Co, Ni, Cu, Zr, Nb, Mo, Ru, Ag, Ta, W, Pt, or Au).

Further, for example, $LiA^1ON$ ($A^1$ represents one or more elements selected from Si, B, Ge, Al, C, or Ga) can be preferably used.

The inorganic solid electrolyte is preferably in the form of particles. In this case, the volume average particle size of the inorganic solid electrolyte is not particularly limited, but is preferably 0.01 μm or more and more preferably 0.1 μm or more. The upper limit is preferably 100 μm or less and more preferably 50 μm or less. The volume average particle size of the inorganic solid electrolyte is measured in the following order. The inorganic solid electrolyte particles are diluted using water (heptane in a case where the inorganic solid electrolyte is unstable in water) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five samples are prepared and the average value thereof is adopted.

As the inorganic solid electrolyte, one kind may be used alone, or two or more kinds may be used in combination.

In a case where a solid electrolyte layer is formed, the mass (mg) of the inorganic solid electrolyte per unit area ($cm^2$) of the solid electrolyte layer (weight per unit area) is not particularly limited. The mass (mg) of the inorganic solid electrolyte can be appropriately determined depending on the set battery capacity and may be, for example, 1 to 100 $mg/cm^2$.

Here, in a case where the solid electrolyte composition includes an active material described below, regarding the weight of the inorganic solid electrolyte per unit area, the total amount of the active material and the inorganic solid electrolyte is preferably in the above-described range.

From the viewpoints of dispersion stability, a reduction in interface resistance, and binding properties, the content of the inorganic solid electrolyte in the solid electrolyte composition is preferably 5 mass % or higher, more preferably 70 mass % or higher, and still more preferably 90 mass % or higher with respect to 100 mass % of the solid content. From the same viewpoint, the upper limit is preferably 99.9 mass % or lower, more preferably 99.5 mass % or lower, and particularly preferably 99 mass % or lower.

Here, in a case where the solid electrolyte composition contains an active material described below, regarding the content of the inorganic solid electrolyte in the solid electrolyte composition, the total content of the active material and the inorganic solid electrolyte is preferably in the above-described range.

In the present specification, the solid content (solid component) refers to components that neither volatilize nor evaporate and disappear in a case where the solid electrolyte composition is dried at 170° C. for 6 hours in a nitrogen atmosphere at a pressure of 1 mmHg. Typically, the solid content refers to components other than a dispersion medium described below.

<Binder Particles>

The solid electrolyte composition according to the embodiment of the present invention includes binder particles having an average particle size of 1 nm to 10 μm. As the binder particles included in the solid electrolyte composition, one kind or two or more kinds may be used. In a case where the solid electrolyte composition includes two or more kinds of binder particles, at least one kind of binder particles may be specific binder particles having an average particle size of 1 nm to 10 μm.

In an electrode sheet for an all-solid state secondary battery and an all-solid state secondary battery (constituent layer) according to the embodiment of the present invention, the binder particles function as a binder that strongly bind the solid particles (for example, particles of the inorganic solid electrolyte, the inorganic solid electrolyte and the active material, and particles of the active material) and further strongly bind the solid particles and the current collector. Further, in the solid electrolyte composition, the binder particles have a function (as a dispersant or an emulsifier) of highly dispersing the solid particles in the dispersion medium with high stability.

The average particle size of the binder particles is 10000 nm or less, preferably 1000 nm or less, more preferably 800 nm or less, still more preferably 500 nm or less, and still more preferably 400 nm or less. The lower limit is 1 nm or more, preferably 5 nm or more, more preferably 10 nm or more, and still more preferably 50 nm or more. By adjusting the size of the binder particles to be in the above-described range, the contact area between the polymer forming the binder particles and the solid particles and the like can be reduced within a range where strong binding properties do not deteriorate, and the resistance can be reduced. That is, binding properties can be improved and interface resistance can be suppressed.

Unless specified otherwise, the average particle size of the binder particles is limited to measurement conditions and a definition described below.

The binder particles are diluted using an appropriate solvent (an organic solvent used for preparing the solid electrolyte composition, for example, heptane) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. The obtained volume average particle size is set as the average particle size. Other detailed conditions and the like can be found in JIS Z8828: 2013 "Particle Size Analysis-Dynamic Light Scattering" as necessary. For each level, five samples are prepared and measured, and the average value thereof is adopted.

In a case where an all-solid state secondary battery is used, the average particle size of the binder particles can be measured for example, by disassembling the all-solid state secondary battery to peel off an active material layer or a solid electrolyte layer, measuring the average particle size of a material of the active material layer or the solid electrolyte layer using the above-described method of measuring the average particle size of the binder particles, and excluding the measured value of the average particle size of the particles other than the binder particles obtained in advance from the average particle size of the material.

The shape of the binder particles in the solid electrolyte composition is not particularly limited as long as they can bind the solid particles to each other as a binder. The shape of the binder particles may be a flat shape or an unstructured shape and is typically a spherical shape or a granular shape.

The binder particles include one kind or two or more kinds of specific polymers and are preferably formed of a specific polymer (particles of the polymer).

The glass transition temperature of the polymer is not particularly limited and is preferably 30° C. or lower. In a case where the glass transition temperature is 30° C. or lower, the dispersibility of the solid electrolyte composition, in particular, the dispersion stability is high, low resistance and strong binding properties for use in a sheet or a constituent layer are exhibited, and excellent battery performance is exhibited. The detailed reason for this is not clear but is presumed to be that, in a case where the solid particles are adhered to each other, the binder particles are deformed along fine unevenness of the solid particle surfaces such that the contact area is improved. From the viewpoints of dispersibility, resistance, and binding properties, the glass transition temperature is preferably 25° C. or lower, more preferably 15° C. or lower, and still more preferably 5° C. or lower. The lower limit of the glass transition temperature is not particularly limited, can be set to, for example, −200° C., and is preferably −150° C. or higher and more preferably −120° C. or higher.

The glass transition temperature (Tg) is measured using a dry sample of the binder particles with a differential scanning calorimeter "X-DSC7000" (trade name, manufactured by SII NanoTechnology Inc.) under the following conditions. The measurement is performed twice using the same sample, and the result of the second measurement is adopted.

Atmosphere in measuring chamber: nitrogen gas (50 mL/min)
Temperature increase rate: 5° C./min
Measurement start temperature: −100° C.
Measurement end temperature: 200° C.
Sample pan: aluminum pan
Mass of measurement sample: 5 mg
Calculation of Tg: Tg is calculated by rounding off the decimal point of an intermediate temperature between a declination start point and a declination end point in a DSC chart In a case where an all-solid state secondary battery is used, the glass transition temperature can be measured, for example, by disassembling the all-solid state secondary battery to peel off an active material layer or a solid electrolyte layer, putting the active material layer or the solid electrolyte layer into water to disperse a material thereof, filtering the dispersion liquid, collecting the remaining solid, and measuring the glass transition temperature of the solid using the above-described measurement method.

It is preferable that the polymer forming the binder particles is amorphous. In the present invention, "amorphous polymer" typically refers to a polymer that shows no endothermic peak caused by crystal melting during measurement using the above-described measurement method of the glass transition temperature.

The weight-average molecular weight of the polymer forming the binder particles is not particularly limited. For example, the weight-average molecular weight is preferably 3,000 or higher, more preferably 5,000 or higher, and still more preferably 7,000 or higher. The upper limit is practically 1,000,000 or lower, and an aspect where the polymer is crosslinked is also preferable.

—Measurement of Molecular Weight—

In the present invention, unless specified otherwise, the molecular weight of the polymer refers to a weight-average molecular weight in terms of standard polystyrene measured by gel permeation chromatography (GPC). Regarding a measurement method, basically, a value measured using a method under the following condition 1 or condition 2 (preferred) is used. In this case, an appropriate eluent may be selected and used depending on the kind of the polymer.

(Condition 1)
Column: a column in which two TOSOH TSKgel Super AWM-H's are linked
Carrier: 10 mM LiBr/N-methylpyrrolidone
Measurement temperature: 40° C.
Carrier flow rate: 1.0 mL/min
Sample concentration: 0.1 mass %
Detector: refractive index (RI) detector (Condition 2) Preferred
Column: a column in which TOSOH TSK gel Super HZM-H, TOSOH TSK gel Super HZ4000, and TOSOH TSK gel Super HZ2000 are linked to each other
Carrier: tetrahydrofuran
Measurement temperature: 40° C.
Carrier flow rate: 1.0 mL/min
Sample concentration: 0.1 mass %
Detector: refractive index (RI) detector In a case where the crosslinking of the polymer progresses due to heating or voltage application, the molecular weight may be higher than the above-described molecular weight. At the start of using the all-solid state secondary battery, the weight-average molecular weight of the polymer forming the binder particles is preferably in the above-described range.

The moisture concentration of the polymer is preferably 100 ppm (by mass) or lower.

In addition, the polymer may be dried by crystallization, or the polymer solution may be used as it is. It is preferable that the amount of a metal catalyst (urethanization or polyesterification catalyst=tin, titanium, or bismuth) is small. By reducing the amount of the metal catalyst during polymerization or by removing the catalyst by crystallization, the metal concentration in the copolymer is preferably 100 ppm (by mass) or lower.

The polymer includes a specific component described below and is not particularly limited as long as it functions as a binder, a dispersant, or the like of the above-described solid particles. A main chain structure (kind), a binding mode, or the like of the polymer can be appropriately set.

In the present invention, the polymer is a (co)polymer of a polymerizable compound that derives the specific component and optionally a copolymerizable compound that is copolymerizable with the polymerizable compound. The polymerizable compound is a compound in which a polymerizable group capable of forming a unique bond depending on the kind of the polymer is bonded to at least one of the aliphatic hydrocarbon chain or the siloxane structure optionally through a linking portion described below.

In the present invention, the main chain of the polymer refers to a molecular chain having a characteristic bond of the kind (bond) of the resin, typically, the longest molecular chain among molecular chains of the polymer (obtained by polymerization of the polymerizable compound and optionally the copolymerizable compound that is copolymerizable with the polymerizable compound). A side chain refers to a molecular chain branched from the main chain of the polymer and typically corresponds to a partial structure (chain) other than the polymerizable group included in the polymerizable compound or the copolymerizable compound.

The polymer may be any one of a homopolymer, a block copolymer, an alternating copolymer, or a random copolymer and may be a graft copolymer. In the present invention, as described below, it is preferable that the polymerizable compound is a macromonomer. Therefore, it is preferable that the polymer is any one of a homopolymer, a block copolymer, an alternating copolymer, or a random copolymer.

The polymer (typically, the molecular chain forming the main chain; in the case of a block copolymer, a molecular chain forming one block) is not particularly limited. For example, polyamide, polyimide, polyurea, a urethane resin, or a (meth)acrylic resin is preferable, and polyurea or a (meth)acrylic resin is more preferable.

The polyamide is a polymer having at least an amide bond in the main chain, and examples thereof include a polycondensate of a diamine compound and a dicarboxylic acid compound and a lactam ring-opening polymerization.

The polyimide is a polymer having at least an imide bond in the main chain, and examples thereof include a polycondensate of tetracarboxylic acid and a diamine compound (that is typically obtained by forming polyamic acid through an addition reaction of tetracarboxylic dianhydride and a diamine compound and closing the ring).

The polyurea is a polymer having at least a urea bond in the main chain, and examples thereof include an addition condensation product of a diisocyanate compound and a diamine compound.

The urethane resin is a polymer having at least a urethane bond in the main chain, and examples thereof include a polyaddition adduct of a diisocyanate compound and a diol compound.

In the (meth)acrylic resin), a repeating unit forming the main chain is an addition polymer of a monomer including a (meth)acryl compound. As the (meth)acryl compound, a compound selected from (meth)acrylic acid, a (meth)acrylic acid ester, a (meth)acrylic acid amide, or an $\alpha,\beta$-unsaturated nitrile compound is preferably used.

The above-described (co)polymerizable compound forming each of the above-described polymers is not particularly limited as long as it has one functional group or at least two functional groups capable of polymerization reaction in the molecule, and a well-known compound of the related art can be appropriately selected and used. The number of functional groups capable of polymerization reaction is determined depending on the kind of the polymerization reaction. For example, in the case of a chain polymerization, at least one functional group may be used.

The polymer includes one or two or more specific components derived from the polymerizable compound among components forming the polymer.

In the present invention, in a case where the polymer is a chain polymer, a component forming the polymer has the same definition as a repeating unit. In a case where the polymer is a sequential polymer, a component forming the polymer refers to a partial structure derived from a raw material compound forming a repeating unit. For example, in a case where the polymer is a urethane resin, a component forming the polymer refers to a partial structure derived from a diisocyanate compound or a partial structure derived from a diol compound. A compound forming the polymer is not particularly limited as long as it is polymerizable under a specific condition, and a compound having an appropriate functional group depending on the kind of the polymer or the like is selected. Examples of the compound include compounds described in the above-described polymer and a combination thereof.

The specific component derived from the polymerizable compound having a molecular weight of lower than 1,000 is incorporated into at least the main chain of the polymer through a binding mode in which the aliphatic hydrocarbon chain or the siloxane structure is a side chain of the polymer, and the specific component as a whole is not incorporated into only the side chain of the polymer.

In a case where the molecular weight of the polymerizable compound that derives the specific component is lower than 1,000, the dispersibility of the solid electrolyte composition, in particular, the dispersion stability is high, low resistance and strong binding properties for use in a sheet or a constituent layer are exhibited, and excellent battery performance is exhibited. The detailed reason is not clear but is presumed to be as follows. In a case where the molecular weight is lower than 1,000, the polymerization reactivity of the polymerizable compound is high, the remaining amount of an unreacted polymerizable compound is small, and deterioration in dispersibility caused by aggregation of the solid particles can be suppressed. From the viewpoints of dispersibility, resistance, and binding properties, the molecular weight of the polymerizable compound is preferably 150 to 999, more preferably 180 to 900, and still more preferably 200 to 850.

The polymerizable compound is preferably a compound other than a macromonomer (a monomer having a high molecular weight that has a polymerizable functional group to be incorporated into the main chain of the polymer and is typically a monomer capable of forming a graft polymer).

The specific component includes at least one of an aliphatic hydrocarbon chain or a siloxane structure having a specific chain length as the side chain of the polymer. In a case where the polymer includes a component in the aliphatic hydrocarbon chain or the siloxane structure, the dispersibility of the solid electrolyte composition, in particular, the dispersion stability is high, low resistance and strong binding properties for use in a sheet or a constituent layer are exhibited, and excellent battery performance is exhibited. The detailed reason is not clear but is presumed to be as follows. The aliphatic hydrocarbon chain or the siloxane structure having a specific chain length exhibits high hydrophobicity (or low polarity), and thus can be stably present in the dispersion medium in the form of particles. Therefore, the solid particles can be stably dispersed in the dispersion medium. Further, in solid particle interfaces having high polarity, the specific component rapidly functions, and the high-polarity portion faces the solid particle surfaces such that binding properties are improved. In addition, during the synthesis of the polymer, the solid electrolyte composition can be prepared as a latex in which the solid particles are dispersed in the dispersion medium. In a case where a sheet or a constituent layer is formed using the solid electrolyte composition, the solid particles can be strongly bonded to each other without inhibiting interface contact between the solid particles. As a result, an increase in interface resistance between the solid particles is suppressed, Li ions and electrons are rapidly transferred between the solid particles, and excellent battery performance is exhibited. Even in a case where bending stress is applied to a sheet or a constituent layer, the excellent battery performance (for example, high output) is maintained without deterioration in strong binding properties between the solid particles.

The number of aliphatic hydrocarbon chains or siloxane structures in the specific component is not particularly limited and can be set to, for example, 1 to 8, preferably 1 to 4, and more preferably 1 or 2.

The aliphatic hydrocarbon chain in the above-described component is not particularly limited as long as it is a carbon chain including the aliphatic hydrocarbon chain, and examples thereof include methane hydrocarbon (alkane), ethylene hydrocarbon (alkene), and acetylene hydrocarbon (alkyne). Among these, methane hydrocarbon is preferable.

The aliphatic hydrocarbon chain is a chain-like structure of aliphatic hydrocarbon to which 10 or more carbon atoms are bonded. The aliphatic hydrocarbon chain may be linear, branched, or cyclic and, from the viewpoints of dispersibility, resistance, and binding properties, is preferably linear. The number of carbon atoms in the aliphatic hydrocarbon chain refers to the total number of carbon atoms forming the aliphatic hydrocarbon chain. Carbon atoms for forming a functional group are not counted as the number of carbon atoms although they are aliphatic carbon atoms. For example, in a case where a C(=O)OH group is bonded to a carbon chain, the carbonyl carbon atom forms an aliphatic hydrocarbon chain having an oxo group and a hydroxyl group as a substituent and is not counted as the number of carbon atoms.

In a case where the above-described component includes an aliphatic hydrocarbon chain having 10 or more carbon atoms, the dispersibility (dispersion stability) of the solid electrolyte composition is high, and low resistance and strong binding properties for use in a sheet or a constituent layer are exhibited. From the viewpoints of dispersibility, resistance, and binding properties, the number of carbon atoms in the aliphatic hydrocarbon chain is preferably 11 or more and more preferably 12 or more. On the other hand, the upper limit of the number of carbon atoms is not particularly limited and, for example, can be set to 50 or less, preferably 40 or less, and more preferably 30 or less.

The aliphatic hydrocarbon chain may have a substituent. The substituent that may be included in the aliphatic hydrocarbon chain is not particularly limited and is preferably a halogen atom (a fluorine atom, a chlorine atom, a bromine atom, or an iodine atom), a cyano group, an alkoxy group (having preferably 1 to 20 carbon atoms, more preferably 1 to 6 carbon atoms, and still more preferably 1 to 3 carbon atoms), or an aryl group (preferably having 6 to 26 carbon atoms and more preferably having 6 to 10 carbon atoms).

It is preferable that the above-described component includes at least one chain structure represented by the following Formula (HC) as the above-described aliphatic hydrocarbon chain.

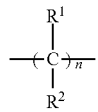

Formula (HC)

In the formula, $R^1$ and $R^2$ each independently represent a hydrogen atom, a halogen atom, a cyano group, an alkyl group, an alkoxy group, or an aryl group. In particular, $R^1$ and $R^2$ each independently represent preferably a hydrogen atom, a halogen atom, or a cyano group and more preferably a hydrogen atom. The halogen atom, the alkoxy group, and the aryl group that may be included in $R^1$ and $R^2$ have the same definitions and the same preferable ranges as those of the halogen atom, the alkoxy group, and the aryl group that may be included in the aliphatic hydrocarbon chain. The alkyl group that may be used as $R^1$ and $R^2$ is not particularly limited and is preferably an alkyl group having 1 to 20 carbon atoms, more preferably an alkyl group having 1 to 6 carbon atoms, and still more preferably an alkyl group having 1 to 3 carbon atoms. In the chain structure represented by Formula (HC), a plurality of $R^1$'s and a plurality of $R^2$'s may be the same as or different from each other.

n represents the number of carbon bonds which is an integer of 10 or more. A preferable range of n is the same as that of the number of carbon atoms in the above-described aliphatic hydrocarbon chain. In a case where the alkyl group is used as $R^1$ and $R^2$, the number of carbon atoms of n includes the number of carbon atoms in the alkyl group as $R^1$ and $R^2$.

The specific component included in the above-describe polymer forming the binder particles include a siloxane structure instead of or together with the above-described aliphatic hydrocarbon chain.

The siloxane structure included in the above-described component may be a structure in which silicon atoms and oxygen atoms are alternately bonded to each other and is preferably a structure represented by the following Formula (SO).

Formula (SO)

$R^3$ and $R^4$ each independently represent a hydrogen atom, a hydroxy group, an alkyl group (having preferably 1 to 12 carbon atoms, more preferably 1 to 6 carbon atoms, and still more preferably 1 to 3 carbon atoms), an alkenyl group (having preferably 2 to 12 carbon atoms, more preferably 2 to 6 carbon atoms, and still more preferably 2 or 3 carbon atoms), an alkoxy group (having preferably 1 to 24 carbon atoms, more preferably 1 to 12 carbon atoms, still more preferably 1 to 6 carbon atoms, and still more preferably 1 to 3 carbon atoms), an aryl group (having preferably 6 to 22 carbon atoms, more preferably 6 to 14 carbon atoms, and still more preferably 6 to 10 carbon atoms), and an aralkyl group (having preferably 7 to 23 carbon atoms, more preferably 7 to 15 carbon atoms, and still more preferably 7 to 11 carbon atoms). The alkyl group, the alkenyl group, the aryl group, and the aralkyl group may have a substituent. In particular, an alkyl group having 1 to 3 carbon atoms, an alkoxy group having 1 to 12 carbon atom, a phenyl group is more preferable, and an alkyl group having 1 to 3 carbon atoms is still more preferable. In the structure represented by Formula (SO), a plurality of $R^3$'s and a plurality of $R^4$'s may be the same as or different from each other. It is still more preferable that $R^3$ and $R^4$ each independently represent a methyl group (dimethylsiloxane structure).

m represents the number of bonds in the siloxane structure, and the molecular weight of the specific component in the polysiloxane structure can be appropriately set in a range of lower than 1000. For example, the molecular weight of the specific component is preferably 100 to 999 and more preferably 150 to 900.

A group positioned in an end portion of the polysiloxane structure is not particularly limited, and examples thereof include an alkyl group (having preferably 1 to 20 carbon atoms, more preferably 1 to 6 carbon atoms, and still more preferably 1 to 3 carbon atoms), an alkoxy group (having preferably 1 to 20 carbon atoms, more preferably 1 to 6 carbon atoms, and still more preferably 1 to 3 carbon atoms), an aryl group (preferably having 6 to 26 carbon atoms and more preferably having 6 to 10 carbon atoms), and a heterocyclic group (preferably having at least one of an oxygen atom, a sulfur atom, or a nitrogen atom; a heterocyclic group having 2 to 20 carbon atoms preferably a 5-membered ring or a 6-membered ring).

In the above-described specific component, a linking portion through which the polymerizable group and the above-described aliphatic hydrocarbon chain or siloxane structure are linked to each other is not particularly limited can be appropriately set depending on the kind of the polymer or the like. Examples of the linking portion include an alkylene group (preferably having 1 to 30 carbon atoms), an arylene group (preferably having 6 to 26 carbon atoms), a carbonyl group (—CO— group), an ether bond (—O—), an imino group (—NR—; R represents a hydrogen atom or a substituent), a thioether bond, a sulfonyl group (—SO$_2$—), a hydroxyphosphoryl group (—PO(OH)—), an alkoxyphosphoryl group (—PO(OR)—; R represents an alkyl group), and a group or a bond including a combination of 2 to 10 groups thereof (preferably 2 to 4 groups thereof). In particular, for example, an alkylene group, a —CO—O— group, a —CO—NR— group, an alkylene group-O—CO— group, or an alkylene group-O—CO-alkylene group-CO—O— group is preferable.

In a case where the polymer is a sequential polymer, it is only necessary that at least one component forming a repeating unit is the above-described specific component, and a plurality of components may be the above-described specific component.

The above-described polymer forming the binder particles may include other components in addition to the above-described specific component. The other components may be components derived from a copolymerizable compound that is copolymerizable with the polymerizable compound deriving the specific component and are appropriately selected depending on the kind of the polymer or the like. For example, in a case where the polymer is a (meth)acrylic resin, a compound having a vinyl polymerizable group, for example, a (meth)acryl compound (other than a polymerizable compound having a molecular weight of lower than 1,000 that includes the above-described aliphatic hydrocarbon chain), a cyclic olefin compound, a diene compound, a styrene compound, a vinyl ether compound, a carboxylic acid vinyl ester compound, or an unsaturated carboxylic anhydride can be used.

Examples of the copolymerizable compound include "vinyl monomer" described in paragraphs "0031" to "0035" of JP2015-088486A and "acrylic monomer" described in paragraphs "0036" to "0042" of JP2015-088486A (excluding those corresponding to the above-described specific component).

It is preferable that the polymer includes a component having a SP value of 10.5 (cal$^{1/2}$ cm$^{-3/2}$) or higher. In the present invention, the SP value (hereinafter, the unit may be omitted) having a SP value of 10.5 or higher represents that the SP value of a structure in which the component is incorporated into the polymer is 10.5 or higher.

The component having a SP value of 10.5 or higher may be the above-described specific component or the above-described other component and is preferably the above-described other component (that is, the SP value of the above-described specific component is preferably lower than 10.5).

From the viewpoint of battery characteristics, the SP value is preferably 11 or higher, more preferably 11.5 or higher, and still more preferably 12 or higher. On the other hand, the upper limit is not particularly limited and is appropriately set. For example, the upper limit is preferably 20 or lower, more preferably 17 or lower, and still more preferably 15 or lower. Unless specified otherwise, the SP value refers to a value obtained using a Hoy method (H. L. Hoy Journal of Painting, 1970, Vol. 42, 76-118).

Examples of a method of setting the SP value of the component to be 10.5 or higher include a method of introducing a functional group having high polarity, for example, a method of introducing a substituent such as a hydroxyl group.

A compound that derives the component having a SP value of 10.5 or higher is not particularly limited, and examples thereof include hydroxyalkyl (meth)acrylate, (meth)acrylic acid (polyoxyalkylene ester), N-mono or di(alkyl) (meth)acrylic acid amide, N-(hydroxyalkyl) (meth) acrylic acid amide, an α,β-unsaturated nitrile compound, a diol compound, a diamine compound, diphenylmethane diisocyanate, and a compound used in Examples described below.

It is preferable that the polymer does not substantially include a component derived from a macromonomer, in particular, a macromonomer having a number-average molecular weight of 1,000 or higher that is measured using the same method as the above-described measurement method of the weight-average molecular weight. In the present invention, "the polymer not substantially including" represents that the polymer may include a substance within a range where the above-described dispersibility and binding properties of the polymer do not deteriorate. For example, the content of a substance in the polymer is lower than 1 mass %.

The content of the above-described specific component in the polymer is not particularly limited. From the viewpoints of the dispersibility of the solid electrolyte composition and the resistance and binding properties of the sheet or the constituent layer, the content is preferably 0.1% to 70 mass %, more preferably 0.3% to 60 mass %, and still more preferably 0.5% to 50 mass %.

The total content of other components derived from the above-described copolymerizable compound is appropriately determined depending on the content of the above-described specific component, the glass transition temperature of the polymer, the SP value of the copolymerizable compound, and the like. For example, the total content of the other components in the polymer is preferably 30% to 99.9 mass %, more preferably 40% to 99.7 mass %, and still more preferably 50% to 99.5 mass %.

In a case where the polymer includes a plurality of other components derived from the copolymerizable compound and the total content of the other components is in the above-described range, the content of each of the other components is appropriately determined depending on, for example, the glass transition temperature of the polymer and the SP value of the copolymerizable compound.

In a case where the polymer includes a component having a SP value of 10.5 or higher, the content of the component is appropriately set depending on, for example, the content of each of the above-described specific component and the above-described components. For example, the content of the component in the polymer is preferably 3% to 99.9 mass %, more preferably 4% to 90 mass %, and still more preferably 5% to 80 mass %.

In a case where the component having a SP value of 10.5 or higher corresponds to the above-described specific component or the other components, the content of the component having a SP value of 10.5 or higher is added to the content of the above-described specific component or the total content of the other components.

In the present invention, the content of the component refers to a content calculated in terms of the molecular weight of the compound before polymerization (the polymerizable compound, the copolymerizable compound, or the compound having a SP value of 10.5 or higher).

It is preferable that the polymer forming the binder particles include at least one functional group selected from the following group of functional groups.

<Group of Functional Groups> an acidic functional group, a basic functional group, a hydroxy group, a cyano group, an alkoxysilyl group, an aryl group, a heteroaryl group, and a hydrocarbon ring group in which three or more rings are fused.

The acidic functional group is not particularly limited, and examples thereof include a carboxylate group (—COOH), a sulfonate group (sulfo group: —SO$_3$H), a phosphate group (phospho group: —OPO(OH)$_2$), a phosphonate group, and a phosphinate group.

The basic functional group is not particularly limited, and examples thereof include an amino group, a pyridyl group, an imino group, and an amidine.

The alkoxysilyl group is not particularly limited and is preferably an alkoxysilyl group having 1 to 6 carbon atoms, and examples thereof include methoxysilyl, ethoxysilyl, t-butoxysilyl, and cyclohexylsilyl.

The aryl group is not particularly limited and is preferably an aryl group having 6 to 10 carbon atoms, and examples thereof include phenyl and naphthyl. It is preferable that the ring in the aryl group is a monocycle or a ring in which two rings are fused.

The heteroaryl group is not particularly limited and is preferably a heteroaryl group having a 4-membered to 10-membered heterocycle, and the number of carbon atoms forming the heterocycle is preferably 3 to 9. Examples of a heteroatom forming the heterocycle include an oxygen atom, a nitrogen atom, and a sulfur atom. Specific examples of the heterocycle include thiophene, furan, pyrrole, and imidazole.

The hydrocarbon ring group in which three or more rings are fused is not particularly limited as long as the hydrocarbon ring is a ring group in which three or more hydrocarbon rings other than the above-described aryl group are fused. Examples of the fused hydrocarbon ring include a saturated aliphatic hydrocarbon ring, an unsaturated aliphatic hydrocarbon ring, and an aromatic hydrocarbon ring (benzene ring). The hydrocarbon ring is preferably a 5-membered ring or a 6-membered ring.

The hydrocarbon ring group in which three or more rings are fused is preferably a ring group in which three or more rings including at least one aromatic hydrocarbon ring are fused or a ring group in which three or more saturated aliphatic hydrocarbon rings or three or more unsaturated aliphatic hydrocarbon rings are fused. The number of rings to be fused is not particularly limited and is preferably 3 to 8 and more preferably 3 to 5.

The ring group in which three or more rings including at least one aromatic hydrocarbon ring are fused is not particularly limited, and examples thereof include a ring group including anthracene, phenanthracene, pyrene, tetracene, tetraphen, chrysene, triphenylene, pentacene, pentaphene, perylene, benzo[a]pyrene, coronene, anthanthrene, corannulene, ovalene, graphene, cycloparaphenylene, polyparaphenylene, or cyclophene.

The ring group in which three or more saturated aliphatic hydrocarbon rings or three or more unsaturated aliphatic hydrocarbon rings are fused is not particularly limited, and examples thereof include a ring group formed of a compound having a steroid skeleton. Examples of the compound having a steroid skeleton include a ring group formed of a compound of cholesterol, ergosterol, testosterone, estradiol, aldosterone, hydrocortisone, stigmasterol, thymosterol, lanosterol, 7-dehydrodesmosterol, 7-dehydrocholesterol, cholanic acid, cholic acid, lithocholic acid, deoxycholic acid, sodium deoxycholate, lithium deoxycholate, hyodeoxycholic acid, chenodeoxycholic acid, ursodeoxycholic acid, dehydrocholic acid, hococholic acid, or hyocholic acid.

As the hydrocarbon ring group in which three or more rings are fused, a ring group formed of a compound having a cholesterol ring structure or a pyrenyl group is more preferable.

The above-described functional group interacts with the solid particles such that the binding function between the solid particles exhibited by the binder particles can be further reinforced. The interaction is not particularly limited, and examples thereof include an interaction by a hydrogen bond, an interaction by an acid-base ionic bond, an interaction by a covalent bond, a π-π interaction by an aromatic ring, and a hydrophobic-hydrophobic interaction. The solid particles and the binder particles adsorb to each other due to one or two or more among the above-described interactions depending on the kind of the functional group and the kind of the above-described particles.

In a case where the functional group interacts, the chemical structure of the functional group may or may not change. For example, in the above-described π-π interaction or the like, typically, the functional group maintains the structure thereof without a change. On the other hand, in the interaction by a covalent bond or the like, typically, the functional group is converted into an anion (the functional group changes) by desorption of active hydrogen such as a carboxylate group and is bonded to the inorganic solid electrolyte.

A carboxylate group, a sulfonate group, a phosphate group, a hydroxy group, a cyano group, or an alkoxysilyl group can be suitably adsorbed to the positive electrode active material and the inorganic solid electrolyte. Among these, a carboxylate group is more preferable.

An aryl group, a heteroaryl group, or an aliphatic hydrocarbon ring group in which three or more rings are fused is suitably adsorbed to the negative electrode active material and the conductive auxiliary agent. In particular, a hydrocarbon ring group in which three or more rings are fused is more preferable.

The functional group may be present at a main chain or a side chain of the polymer or at a terminal thereof and is more preferably introduced into a side chain or a terminal thereof. For example, in the above-described specific component, it is preferable that the functional group is introduced into the above-described aliphatic hydrocarbon chain or the above-described linking portion.

The number of functional groups included in the polymer may be at least one and is preferably two or more, and is specifically determined depending on the content (mol) of a component having the functional group and the mol number of the polymer.

A method of introducing the above-described functional group into the polymer is not particularly limited, and examples thereof include a method of polymerizing the compound having the functional group and a method of substituting a hydrogen atom or the like in the polymer with the above-described functional group.

The binder particles are commercially available or can be prepared by polymerizing the polymerizable compound, the copolymerizable compound, and the like according to a typical polymerization reaction, a condensation reaction, or the like in the presence of a surfactant, an emulsifier or a dispersant, a condensation catalyst, and the like. During the preparation, since the polymerizable compound functions as the emulsifier, the polymer is typically formed as spherical or granular resin particles. The average particle size of the polymer can be appropriately set in a predetermined range depending on the kinds of the polymerizable compound, the copolymerizable compound, and the like, the amounts of dispersed components, a polymerization temperature, a dropping time, and a dropping method.

The solvent used for the polymerization reaction or the condensation reaction of the polymer is not particularly limited. It is preferable that a solvent that is not reactive with and does not decompose the inorganic solid electrolyte or the active material is used. For example, a hydrocarbon solvent (toluene, heptane, or xylene), an ester solvent (ethyl acetate or propylene glycol monomethyl ether acetate), an ether solvent (tetrahydrofuran, dioxane, or 1,2-diethoxyethane), a ketone solvent (acetone, methyl ethyl ketone, or cyclohexanone), a nitrile solvent (acetonitrile, propionitrile, butyronitrile, or isobutyronitrile), or a halogen solvent (dichloromethane or chloroform) can be used.

The content of the binder particles in the solid electrolyte composition is preferably 0.1 mass % or higher, more preferably 0.2 mass % or higher, and still more preferably 0.3 mass % or higher with respect to the solid content of the solid electrolyte composition. The upper limit of the concentration is preferably 30 mass % or lower, more preferably 20 mass % or lower, and still more preferably 10 mass % or lower.

By using the binder particles in the above-described range, binding properties of the solid electrolyte and suppression in interface resistance can be more effectively achieved at the same time.

<Dispersion Medium>

The solid electrolyte composition according to the embodiment of the present invention includes a dispersion medium.

The dispersion medium is not particularly limited as long as it disperses the above-described respective components, and examples thereof include various organic solvents. Examples of the organic solvent include the respective solvents of an alcohol compound, an ether compound, an amide compound, an amine compound, a ketone compound, an aromatic compound, an aliphatic compound, a nitrile compound, and an ester compound. Specific examples of the dispersion medium are as follows.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of an ether compound include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, or diethylene glycol monobutyl ether), dialkyl ether (for example, dimethyl ether, diethyl ether, diisopropyl ether, or dibutyl ether), and cyclic ether (for example, tetrahydrofuran or dioxane (including respective isomers of 1,2-, 1,3, and 1,4-)).

Examples of the amide compound include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methyl acetamide, N,N-dimethyl acetamide, N-methylpropanamide, and hexamethylphosphorictriamide.

Examples of the amine compound include triethylamine, diisopropylethylamine, and tributylamine.

Examples of the ketone compound include acetone, methyl ethyl ketone, methyl isobutyl ketone, and cyclohexanone.

Examples of the aromatic compound include benzene, toluene, and xylene.

Examples of the aliphatic compound include hexane, heptane, octane, and decane.

Examples of the nitrile compound include acetonitrile, propionitrile, and isobutyronitrile.

Examples of the ester compound include ethyl acetate, butyl acetate, propyl acetate, butyl butyrate, and butyl pentanoate.

Examples of a non-aqueous dispersion medium include the aromatic compound and the aliphatic compound described above.

In the present invention, the amine compound, the ether compound, the ketone compound, the aromatic compound, or the aliphatic compound is preferable, and the ether compound, the aromatic compound, or the aliphatic compound is more preferable. In the present invention, it is preferable that the sulfide-based inorganic solid electrolyte is used and the above-described specific organic solvent is selected. By selecting this combination, a functional group that is active with the sulfide-based inorganic solid electrolyte is not included, and thus the sulfide-based inorganic solid electrolyte can be stably handled, which is preferable. In particular, a combination of the sulfide-based inorganic solid electrolyte and the aliphatic compound is preferable.

The boiling point of the dispersion medium under normal pressure (1 atm) is preferably 50° C. or higher and more preferably 70° C. or higher. The upper limit is more preferably 250° C. or lower and still more preferably 220° C. or lower.

As the dispersion medium, one kind may be used alone, or two or more kinds may be used in combination.

In the present invention, the content of the dispersion medium in the solid electrolyte composition is not particularly limited and can be appropriately set. For example, the content of the dispersion medium in the solid electrolyte composition is preferably 20% to 99 mass %, more preferably 25% to 70 mass %, and still more preferably 30% to 60 mass %.

<Active Material>

The solid electrolyte composition according to the embodiment of the present invention may also include the active material (D) capable of intercalating and deintercalating ions of a metal belonging to Group 1 or Group 2 in the periodic table. Although described below, examples of the active material include a positive electrode active material and a negative electrode active material. In particular, a transition metal oxide (preferably a transition metal oxide) that is the positive electrode active material, a metal oxide that is the negative electrode active material, or metal such as Sn, Si, Al, or In capable of forming an alloy with lithium is preferable.

In the present invention, the solid electrolyte composition including the active material (the positive electrode active material or the negative electrode active material) will be referred to as an electrode layer composition (a positive electrode layer composition or a negative electrode layer composition).

(Positive Electrode Active Material)

A positive electrode active material that may be included in the solid electrolyte composition of the embodiment of the present invention is preferably a positive electrode active material capable of reversibly intercalating and/or deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio Li/$M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (circle-equivalent average particle size) of positive electrode active material particles is not particularly limited. For example, the volume average particle size can be set to 0.1 to 50 µm. In order to allow the positive electrode active material to have a predetermined particle size, an ordinary pulverizer or classifier may be used. Positive electrode active materials obtained using a calcination method may be used after being washed with water, an acidic aqueous solution, an alkaline aqueous solution, or an organic solvent. The volume average particle size (circle-equivalent average particle size) of positive electrode active material particles can be measured using a laser diffraction/scattering particle size distribution analyzer LA-920 (trade name, manufactured by Horiba Ltd.).

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited. The mass (mg) of the inorganic solid electrolyte can be appropriately determined depending on the set battery capacity and may be, for example, 1 to 100 mg/$cm^2$.

The content of the positive electrode active material in the solid electrolyte composition is not particularly limited, but is preferably 10% to 97 mass %, more preferably 30% to 95 mass %, still more preferably 40% to 93 mass %, and particularly preferably 50% to 90 mass % with respect to a solid content of 100 mass %.

(Negative Electrode Active Material)

A negative electrode active material that may be included in the solid electrolyte composition of the embodiment of the present invention is preferably a negative electrode active material capable of reversibly intercalating and/or deintercalating lithium ions. The above-described material is not particularly limited as long as the material has the above-described characteristics, and examples thereof include carbonaceous materials, metal oxides such as tin oxide, silicon oxide, metal composite oxides, a lithium single body, lithium alloys such as lithium aluminum alloys, metals capable of forming alloys with lithium such as Sn, Si, Al, and In and the like. Among these, a carbonaceous material or a lithium composite oxide is preferably used from the viewpoint of reliability. In addition, the metal composite oxide is preferably capable of intercalating and deintercalating lithium. The material is not particularly limited, but preferably includes titanium and/or lithium as a constituent element from the viewpoint of high current density charging-discharging characteristics.

The carbonaceous material which is used as the negative electrode active material is a material substantially containing carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 2θ when measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystal diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Si, Sn, Ge, Pb, Sb, and Bi, and chalcogenides are particularly preferable. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be composite oxides with lithium oxide, for example, $Li_2SnO_2$.

The negative electrode active material preferably contains a titanium atom. More specifically, $Li_4Ti_5O_{12}$ (lithium titanium oxide [LTO]) is preferable since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

In the present invention, hard carbon or graphite is preferably used, and graphite is more preferably used. In the present invention, as the above-described carbonaceous material, one kind may be used alone, or two or more kinds may be used in combination.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit weight increases. Therefore, it is possible to increase the battery capacity. As a result, there is an advantage that the battery driving duration can be extended.

The chemical formulae of the compounds obtained using a calcination method can be calculated using inductively coupled plasma (ICP) optical emission spectroscopy as a measurement method from the mass difference of powder before and after calcinating as a convenient method.

Preferable examples of the negative electrode active material which can be used in combination with the amorphous oxide as negative electrode active material containing Sn, Si, or Ge as a major component include carbon materials that can intercalate and/or deintercalate lithium ions or lithium metal; lithium; lithium alloys; and metals that can form an alloy with lithium.

The shape of the negative electrode active material is not particularly limited, but is preferably a particle shape. The average particle size of the negative electrode active material is preferably 0.1 to 60 μm. In order to obtain a predetermined particle size, an ordinary pulverizer and/or classifier is used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method. The average particle size of negative electrode active material particles can be measured using the same method as the method of measuring the volume average particle size of the positive electrode active material.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited. The mass (mg) of the inorganic solid electrolyte can be appropriately determined depending on the set battery capacity and may be, for example, 1 to 100 mg/$cm^2$.

The content of the negative electrode active material in the solid electrolyte composition is not particularly limited and is preferably 10% to 90 mass %, more preferably 20% to 85 mass %, still more preferably 30% to 80 mass %, and still more preferably 40% to 75 mass % with respect to 100 mass % of the solid content.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

<Conductive Auxiliary Agent>

The solid electrolyte composition according to the embodiment of the present invention may optionally include a conductive auxiliary agent used for improving, for example, the electron conductivity of the active material. As the conductive auxiliary agent, a general conductive auxiliary agent can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

In a case where the solid electrolyte composition according to the embodiment of the present invention includes a conductive auxiliary agent, the content of the conductive auxiliary agent is preferably 0% to 10 mass %.

<Lithium Salt>

It is also preferable that the solid electrolyte composition according to the embodiment of the present invention includes a lithium salt (supporting electrolyte).

The lithium salt is preferably a lithium salt used for this kind of product and is not particularly limited. For example, a lithium salt described in paragraphs "0082" to "0085" of JP2015-088486A is preferable.

In a case where the solid electrolyte composition according the embodiment of the present invention includes a lithium salt, the content of the lithium salt is preferably 0.1 parts by mass or more and more preferably 5 parts by mass or more with respect to 100 parts by mass of the solid electrolyte. The upper limit is preferably 50 parts by mass or less and more preferably 20 parts by mass or less.

<Dispersant>

The solid electrolyte composition according to the embodiment of the present invention includes binder particles that also function as a dispersant (emulsifier) of the solid particles. Therefore, the solid electrolyte composition according to the embodiment of the present invention may not include a dispersant other than the binder particles and optionally may include a dispersant. Aggregation of the inorganic solid electrolyte and the like can be suppressed, and the active material layer and the solid electrolyte layer can be homogeneously formed. As the dispersant, a dispersant that is generally used for an all-solid state secondary battery can be appropriately selected and used. Generally, a compound intended for particle adsorption and steric repulsion and/or electrostatic repulsion is preferably used.

<Other Additives>

As components other than the respective components described above, the solid electrolyte composition according to the embodiment of the present invention may optionally include an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant.

The ionic liquid is added to improved the ion conductivity, and a well-known material can be used without any particular limitation.

(Preparation of Solid Electrolyte Composition)

The solid electrolyte composition according to the embodiment of the present invention can be prepared, preferably, as a slurry by mixing the inorganic solid electrolyte, the binder particles, and the dispersion medium and optionally other components, for example using various mixers.

A mixing method is not particularly limited, and the components may be mixed at once or sequentially.

The mixer is not particularly limited, and examples thereof include a ball mill, a beads mill, a planetary mixer, a blade mixer, a roll mill, a kneader, and a disc mill. Mixing conditions are not particularly limited. For example, the mixing temperature is set to 10° C. to 60° C., the mixing time is set to 5 minutes to 5 hours, and the rotation speed is set to 10 to 700 rpm (rotation per minute). In a case where a ball mill is used as the mixer, at the above-described mixing temperature, it is preferable that the rotation speed is set to 150 to 700 rpm and the mixing time is 5 minutes to 24 hours. The amounts of the respective components blended are preferably set to be the above-described contents.

A mixing environment is not particularly limited, and examples thereof include a dry air environment and an inert gas environment.

In the solid electrolyte composition according to the embodiment of the present invention, reaggregation of the solid particles can be suppressed, the solid particles can be highly dispersed, and the dispersed state of the composition can be maintained (high dispersion stability can be exhibited). Therefore, as described below, the solid electrolyte composition according to the embodiment of the present invention can be preferably used as a material for forming an active material layer of an all-solid state secondary battery or an electrode sheet for an all-solid state secondary battery.

[Sheet for all-Solid State Secondary Battery]

A sheet for an all-solid state secondary battery according to the embodiment of the present invention is a sheet-shaped molded body with which a constituent layer of an all-solid state secondary battery can be formed, and includes various aspects depending on uses thereof. Examples of the sheet for an all-solid state secondary battery include a sheet that is preferably used in a solid electrolyte layer (also referred to as a solid electrolyte sheet for an all-solid state secondary battery), and a sheet that is preferably used in an electrode or a laminate of an electrode and a solid electrolyte layer (an electrode sheet for an all-solid state secondary battery). In the present invention, these various sheets will also be collectively referred to as a sheet for an all-solid state secondary battery.

The solid electrolyte sheet for an all-solid state secondary battery according to the embodiment of the present invention is not particularly limited as long as it is a sheet including a solid electrolyte layer, and may be a sheet in which a solid electrolyte layer is formed on a substrate or may be a sheet that is formed of a solid electrolyte layer without including a substrate. The solid electrolyte sheet for an all-solid state secondary battery may include other layers as long as it includes a solid electrolyte layer. Examples of the other layers include a protective layer (release sheet), a current collector, and a coating layer.

Examples of the solid electrolyte sheet for an all-solid state secondary battery include a sheet including a solid electrolyte layer and optionally a protective layer on a substrate in this order.

The substrate is not particularly limited as long as it can support the solid electrolyte layer, and examples thereof include a sheet body (plate-shaped body) formed of a materials, an organic material, an inorganic material, or the like described below regarding the current collector. Examples of the organic materials include various polymers, and specific examples thereof include polyethylene terephthalate, polypropylene, polyethylene, and cellulose. Examples of the inorganic materials include glass and ceramic.

The configuration and thickness of the solid electrolyte layer in the sheet for an all-solid state secondary battery are the same as the configuration and thickness of the solid electrolyte layer described below regarding the all-solid state secondary battery according to the embodiment of the present invention.

An electrode sheet for an all-solid state secondary battery according to the embodiment of the present invention (simply also referred to as "electrode sheet according to the embodiment of the present invention") is not particularly limited as long as it is an electrode sheet including an active material layer, and may be a sheet in which an active material layer is formed on a substrate (current collector) or may be a sheet that is formed of an active material layer without including a substrate. The electrode sheet is typically a sheet including the current collector and the active material layer, and examples of an aspect thereof include an aspect including the current collector, the active material layer, and the solid electrolyte layer in this order and an aspect including the current collector, the active material layer, the solid electrolyte layer, and the active material layer in this order. The electrode sheet according to the embodiment of the present invention may include the above-described other layers as long as includes the active material layer. The thickness of each of the layers forming the electrode sheet according to the embodiment of the present invention is the same as the thickness of each of layers described below regarding the all-solid state secondary battery.

[Preparation of Sheet for all-Solid State Secondary Battery]

A method of manufacturing a sheet for an all-solid state secondary battery according to the embodiment of the present invention is not particularly limited. The sheet for an all-solid state secondary battery according to the embodiment of the present invention can be manufactured by forming the respective layers using the solid electrolyte composition according to the embodiment of the present invention. Examples of the method include a method of forming a film (drying and applying) of the solid electrolyte composition to form a layer (applied and dried layer) formed of the solid electrolyte composition optionally on a substrate or a current collector (other layers may be interposed therebetween). As a result, the sheet for an all-solid state secondary battery including optionally the substrate or the current collector and the applied and dried layer can be prepared. Here, the applied and dried layer refers to a layer formed by applying the solid electrolyte composition according to the embodiment of the present invention and drying the dispersion medium (that is, a layer formed using the solid electrolyte composition according to the embodiment of the present invention and made of a composition obtained by removing the dispersion medium from the solid electrolyte composition according to the embodiment of the present invention).

Each of steps of application, drying, or the like in the method of manufacturing a sheet for an all-solid state secondary battery according to the embodiment of the present invention will be described below regarding a method of manufacturing an all-solid state secondary battery.

In the method of manufacturing a sheet for an all-solid state secondary battery according to the embodiment of the present invention, it is also possible to pressurize the applied and dried layer obtained as described above. Pressurization conditions or the like will be described below regarding the method of manufacturing an all-solid state secondary battery.

In addition, in the method of manufacturing a sheet for an all-solid state secondary battery according to the embodiment of the present invention, it is also possible to peel the substrate, the protective layer (particularly, the release sheet), or the like.

In the sheet for an all-solid state secondary battery according to the embodiment of the present invention, at least one of the solid electrolyte layer or the active material layer is formed of the solid electrolyte composition according to the embodiment of the present invention, an increase in interface resistance between the solid particles is effectively suppressed, and the solid particles are strongly bonded to each other. Accordingly, the sheet for an all-solid state secondary battery can be suitably used as a sheet with which a constituent layer of an all-solid state secondary battery. In particular, in a case where the sheet for an all-solid state secondary battery is manufactured in-line in an elongated shape (is wound during transport) and used as a wound battery, the binding state of the solid particles in the solid electrolyte layer and the active material layer can be maintained even in a case where bending stress is applied to the solid electrolyte layer and the active material layer. In a case where an all-solid state secondary battery is manufactured using the sheet for an all-solid state secondary battery manufactured using the above-described manufacturing method, high productivity and yield (reproducibility) can be realized while maintaining excellent battery performance.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is formed optionally on a positive electrode current collector to configure a positive electrode. The negative electrode active material layer is formed optionally on a negative electrode current collector to configure a negative electrode.

It is preferable that at least one of the negative electrode active material layer, the positive electrode active material layer, or the solid electrolyte layer is formed of the solid electrolyte composition according to the embodiment of the present invention, and it is more preferable that all the layers are formed of the solid electrolyte composition according to the embodiment of the present invention. In the active material layer or the solid electrolyte layer formed of the solid electrolyte composition according to the embodiment of the present invention, the kinds of components to be included and the content ratio thereof are the same as those of the solid content of the solid electrolyte composition according to the embodiment of the present invention. In a case where the active material layer or the solid electrolyte layer is not formed of the solid electrolyte composition according to the embodiment of the present invention, a well-known material can be used.

The thicknesses of the negative electrode active material layer, the solid electrolyte layer, and the positive electrode active material layer are not particularly limited respectively. In consideration of the dimension of a general all-solid state secondary battery, each of the thicknesses of the respective layers is preferably 10 to 1,000 µm and more preferably 20 µm or more and less than 500 µm. In the all-solid state secondary battery according to the embodiment of the present invention, the thickness of at least one layer of the positive electrode active material layer or the negative electrode active material layer is still more preferably 50 µm or more and less than 500 µm.

Each of the positive electrode active material layer and the negative electrode active material layer may include the current collector opposite to the solid electrolyte layer.

[Case]

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short circuit prevention.

Hereinafter, an all-solid state secondary battery according to a preferred embodiment of the present invention will be described with reference to FIG. 1, but the present invention is not limited thereto.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and adjacent to each other. In a case in which the above-described structure is employed, during charging, electrons (e⁻) are supplied to the negative electrode side, and lithium ions (Li⁺) are accumulated in the negative electrode side. On the other hand, during discharging, the lithium ions (Li⁺) accumulated in the negative electrode side return to the positive electrode, and electrons are supplied to an operation portion 6. In an example illustrated in the drawing, an electric bulb is employed as a model of the operation portion 6 and is lit by discharging.

In a case where the all-solid state secondary battery having a layer configuration illustrated in FIG. 1 is put into a 2032-type coin case, the all-solid state secondary battery will be referred to as "electrode sheet for an all-solid state secondary battery", and a battery prepared by putting this electrode sheet for an all-solid state secondary battery into a 2032-type coin case will be referred to as "all-solid state secondary battery", thereby referring to both batteries distinctively in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed using the solid electrolyte composition according to the embodiment of the present invention. In the all-solid state secondary battery 10, the electrical resistance is low, and excellent battery performance is exhibited. The inorganic solid electrolyte and the binder particles in the positive electrode active material layer 4, the solid electrolyte layer 3, and the negative electrode active material layer 2 may be the same as or different from each other.

In the present invention, either or both of the positive electrode active material layer and the negative electrode active material layer will also be simply referred to as the active material layer or the electrode active material layer. In addition, either or both of the positive electrode active material and the negative electrode active material will also be simply referred to as the active material or the electrode active material.

In the present invention, in a case where the above-described binder particles are used in combination with the solid particles such as the inorganic solid electrolyte or the active material, as described above, an increase in interface resistance between the solid particles and an increase in interface resistance between the solid particles and the current collector can be suppressed. Further, poor contact between the solid particles and peeling (release) of the solid particles from the current collector can be suppressed. Therefore, the all-solid state secondary battery according to the embodiment of the present invention exhibits excellent battery characteristics. In particular, in the all-solid state secondary battery according to the embodiment of the present invention formed of the above-described binder particles in which the solid particles and the like capable of strongly binding the solid particles and the like to each other, as described above, excellent battery characteristics can be maintained even in a case where bending stress is applied to, for example, a manufacturing step of the sheet for an all-solid state secondary battery or the all-solid state secondary battery.

In the all-solid state secondary battery 10, the negative electrode active material layer can be formed as a lithium metal layer. Examples of the lithium metal layer include a layer formed by deposition or forming of lithium metal powder, a lithium foil, and a lithium deposited film. The thickness of the lithium metal layer is not limited to the above-described thickness of the above-described negative electrode active material layer and may be, for example, 1 to 500 μm.

The positive electrode current collector 5 and the negative electrode current collector 1 are preferably an electron conductor.

In the present invention, either or both of the positive electrode current collector and the negative electrode current collector will also be simply referred to as the current collector.

As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited, but is preferably 1 to 500 μm. In addition, it is also preferable that the surface of the current collector is made to be uneven through a surface treatment.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof. In addition, each of the layers may have a single-layer structure or a multi-layer structure.

[Manufacturing of all-Solid State Secondary Battery]

The all-solid state secondary battery can be manufactured using an ordinary method. Specifically, the all-solid state secondary battery can be manufactured by forming the respective layers using the solid electrolyte composition according to the embodiment of the present invention and the like. As a result, the all-solid state secondary battery in which the electrical resistance is low and excellent battery performance is exhibited can be manufactured. Hereinafter, the details will be described in detail.

The all-solid state secondary battery according to the embodiment of the present invention can be manufactured through a method (the method of manufacturing a sheet for an all-solid state secondary battery according to the embodiment of the present invention) including (through) a step of applying (forming a film using) the solid electrolyte composition according to the embodiment of the present invention to the substrate (for example, the metal foil as the current collector) to form a coating film.

For example, the solid electrolyte composition including the positive electrode active material is applied as a positive electrode material (positive electrode layer composition) to a metal foil which is a positive electrode current collector so as to form a positive electrode active material layer. As a result, a positive electrode sheet for an all-solid state secondary battery is prepared. Next, the solid electrolyte composition for forming a solid electrolyte layer is applied to the positive electrode active material layer so as to form the solid electrolyte layer. Further, the solid electrolyte composition including the negative electrode active material is applied as a negative electrode material (negative electrode layer composition) to the solid electrolyte layer so as to form a negative electrode active material layer. By laminating the negative electrode current collector (metal foil) on the negative electrode active material layer, an all-solid state secondary battery having a structure in which the solid electrolyte layer is sandwiched between the positive electrode active material layer and the negative electrode active material layer can be obtained. Optionally by sealing the laminate in a case, a desired all-solid state secondary battery can be obtained.

In addition, an all-solid state secondary battery can also be manufactured by forming the negative electrode active material layer, the solid electrolyte layer, and the positive electrode active material layer on the negative electrode current collector in order reverse to that of the method of forming the respective layers and laminating the positive electrode current collector thereon.

As another method, for example, the following method can be used. That is, the positive electrode sheet for an all-solid state secondary battery is prepared as described above. In addition, the solid electrolyte composition including the negative electrode active material is applied as a negative electrode material (negative electrode layer composition) to a metal foil which is a negative electrode current collector so as to form a negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are produced as described above. In addition, separately from the electrode sheets, the solid electrolyte composition is applied to a substrate to prepare a solid electrolyte sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer removed from the substrate is sandwiched therebetween. This way, an all-solid state secondary battery can be manufactured.

An all-solid state secondary battery can also be manufactured by combining the above-described forming methods. For example, the positive electrode sheet for an all-solid state secondary battery, the negative electrode sheet for an all-solid state secondary battery, and the solid electrolyte sheet for an all-solid state secondary battery are prepared respectively. Next, the solid electrolyte layer removed from the substrate is laminated on the negative electrode sheet for an all-solid state secondary battery, and the positive electrode sheet for an all-solid state secondary battery is bonded thereto. As a result, an all-solid state secondary battery can be manufactured. In this method, it is also possible to laminate the solid electrolyte layer on the positive electrode sheet for an all-solid state secondary battery and to bond the solid electrolyte layer to the negative electrode sheet for an all-solid state secondary battery.

In the above-described manufacturing method, the solid electrolyte composition according to the embodiment of the present invention may be used as any one of the positive electrode layer composition, the solid electrolyte composition, or the negative electrode layer composition, and is preferably used as all of the compositions.

<Formation of Respective layers (Film Formation)>

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (applied and dried layer). In addition, the temperature is not excessively increased, and the respective members of the all-solid state secondary battery are not impaired, which is preferable. Therefore, in the all-solid state secondary battery, excellent total performance can be exhibited, and excellent binding properties and excellent ion conductivity can be obtained even under no pressure.

As described above, in a case where the solid electrolyte composition according to the embodiment of the present invention is applied and dried, the applied and dried layer in which the interface resistance between the solid particles is low and the solid particles are strongly bonded to each other can be formed.

After the application of the solid electrolyte composition or after the preparation of the all-solid state secondary battery, the respective layers or the all-solid state secondary battery is preferably pressurized. In addition, the respective layers are also preferably pressurized in a state where they are laminated. Examples of the pressurization method include a method using a hydraulic cylinder pressing machine. The pressure is not particularly limited, but is, generally, preferably in a range of 50 to 1,500 MPa.

In addition, the applied solid electrolyte composition may be heated while being pressurized. The heating temperature is not particularly limited, but is generally in a range of 30° C. to 300° C. The respective layers or the all-solid state secondary battery can also be pressed at a temperature higher than the glass transition temperature of the inorganic solid electrolyte. On the other hand, in a case where the inorganic solid electrolyte and the binder particles are present together, the respective layers or the all-solid state secondary battery can also be pressed at a temperature higher than the glass transition temperature of the above-described polymer forming the binder particles. In general, the pressing temperature does not exceed the melting point of the above-described polymer.

The pressurization may be carried out in a state in which a coating solvent or the dispersion medium has been dried in advance or in a state in which the solvent or the dispersion medium remains.

The respective compositions may be applied at the same time, and the application, the drying, and the pressing may be carried out simultaneously and/or sequentially. The respective compositions may be applied to separate substrates and then laminated by transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be homogeneous or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery according to the embodiment of the present invention can be applied to a variety of usages. The application embodiment is not particularly limited, and examples of an electronic apparatus to which the non-aqueous secondary cell is applied include a laptop computer, a pen-input PC, a mobile PC, an electronic book player, a mobile phone, a cord-less phone system, a pager, a handy terminal, a portable fax, a portable copying machine, a portable printer, a headphone stereo set, a video camera, a liquid crystal television, a handy cleaner, a portable CD player, a mini disc player, an electric shaver, a transceiver, an electronic organizer, an electronic calculator, a memory card reader, a portable tape recorder, a radio player, a backup power supply, and a memory card reader. In addition, examples of an electronic apparatus for consumer use include an automobile, an electromotive vehicle, a motor, a lighting device, a toy, a game device, a load conditioner, a timepiece, a strobe, a camera, a medical device (for example, a pacemaker, a hearing aid, or a shoulder massager). Further, the all-solid state secondary battery can be used as various cells for use in military or aerospace applications. In addition, the all-solid state secondary battery can also be combined with solar batteries.

EXAMPLES

Hereinafter, the present invention will be described in more detail on the basis of examples. Meanwhile, the present invention is not interpreted to be limited thereto. "Parts" and "%" that represent compositions in the following examples are mass-based unless particularly otherwise described. In the present invention, "room temperature" refers to 25° C.

Example 1

In Example 1, an sheet for an all-solid state secondary battery was manufactured, and the performance thereof was evaluated. The results are shown in Tables 1 to 3.

<Synthesis of Binder Particles (Preparation of Binder Particle Dispersion Liquid)>

(Preparation of Binder Particle Dispersion Liquid P-1 Formed of (Meth)Acrylic Resin)

420 parts by mass of heptane and 45 parts by mass of lauryl methacrylate (manufactured by Wako Pure Chemical Industries, Ltd.) were added to a 1 L three-neck flask equipped with a reflux cooling pipe and a gas introduction coke, nitrogen gas was introduced at a flow rate of 200 mL/min for 10 minutes, and the solution was heated to 80° C. A liquid (a solution in which 9 parts by mass of hydroxyethyl acrylate (manufactured by Wako Pure Chemical Industries, Ltd.), 117 parts by mass of methyl methacrylate (manufactured by Wako Pure Chemical Industries, Ltd.), 9 parts by mass of methacrylic acid (manufactured by Wako Pure Chemical Industries, Ltd.), and 7.2 parts by mass of a radical polymerization initiator V-601 (trade name, manufactured by Wako Pure Chemical Industries, Ltd.) were mixed with each other) prepared in a separate container was added dropwise to the solution for 2 hours and was stirred at 80° C. for 2 hours. Next, 1.2 parts by mass of a radical polymerization initiator V-601 was further added, and the solution was stirred at 95° C. for 2 hours. The obtained solution was cooled to room temperature, and a binder particle dispersion liquid P-1 was obtained.

(Preparation of Binder Particle Dispersion Liquids P-2 to P-11 and P-13 Formed of (Meth)Acrylic Resin)

Binder particle dispersion liquids P-2 to P-11 and P-13 were prepared using the same preparation method as that of the binder particle dispersion liquid P-1, except that the kinds and the ratios (contents) of the polymerizable compound and the copolymerizable compound and the kind of the dispersion medium were changed as shown in Table 1 below.

(Preparation of Binder Particle Dispersion Liquid P-12 Formed of Polyurethane)

2.0 g of 1,2-dodecanediol was put into a 200 mL three-neck flask and was dissolved in 30 mL of heptane. 2.5 g of diphenylmethane diisocyanate (MDI) was added to the solution, the solution was stirred at 65° C., 0.025 g of a bismuth catalyst (trade name: NEOSTANN U-600, manufactured by Nitto Kasei Co., Ltd.) was added thereto, and the solution was stirred at 65° C. for 6 hours. This way, a binder particle dispersion liquid P-12 was obtained.

(Preparation of Binder Particle Dispersion Liquid CP-1 Formed of (Meth)Acrylic Resin)

A binder particle dispersion liquid CP-1 was prepared using the same preparation method as that of the binder particle dispersion liquid P-1, except that the kinds and the ratios (contents) of the polymerizable compound and the copolymerizable compound were changed as shown in Table 1 below.

(Preparation of Binder Particle Dispersion Liquid CP-2 Formed of (Meth)Acrylic Resin)

400 parts by mass of water, 200 parts by mass of methyl methacrylate (manufactured by Wako Pure Chemical Industries, Ltd.), 50 parts by mass of styrene (manufactured by Wako Pure Chemical Industries, Ltd.), 5 parts by mass of divinylbenzene (manufactured by Wako Pure Chemical Industries, Ltd.), 10 parts by mass of sodium dodecylbenzene sulfonate (manufactured by Wako Pure Chemical Industries, Ltd.), and 10 parts by mass of azobisbutyronitrile (manufactured by Wako Pure Chemical Industries, Ltd.) were added to a 5 L three-neck flask equipped with a reflux cooling pipe and a gas introduction coke, nitrogen gas was introduced at a flow rate of 200 mL/min for 10 minutes, and the solution was heated to 80° C. A liquid (a solution in which 400 parts by mass of nonylphenoxy polyethylene glycol acrylate (manufactured by Hitachi Chemical Co., Ltd.), 100 parts by mass of styrene (manufactured by Wako Pure Chemical Industries, Ltd.), 800 parts by mass of water, and 10 parts by mass of azobisbutyronitrile (manufactured by Wako Pure Chemical Industries, Ltd.) were mixed with each other) prepared in a separate container was added dropwise to the solution and was stirred at 80° C. for 5 hours. Next, 15,000 parts by mass of decalin (manufactured by Wako Pure Chemical Industries, Ltd.) was added, the solution was sufficiently stirred, and water was removed by drying under reduced pressure. As a result, a binder particle dispersion liquid CP-2 was obtained.

The binder particle dispersion liquid CP-2 was not able to be prepared in an organic dispersant unlike the binder particle dispersion liquid CP-1. Therefore, the binder particle were prepared by substituting the solvent with decalin after synthesis in water. The same shall be applied to binder particle dispersion liquids CP-3 and CP-4.

(Preparation of Binder Particle Dispersion Liquid CP-3 Formed of (Meth)Acrylic Resin)

A binder particle dispersion liquid CP-3 was prepared using the same preparation method as that of the binder particle dispersion liquid CP-2, except that the kinds and the ratios (contents) of the polymerizable compound and the copolymerizable compound were changed as shown in Table 1 below.

(Preparation of Binder Particle Dispersion Liquid CP-4 Formed of (Meth)Acrylic Resin)

A binder particle dispersion liquid CP-4 was prepared using the same preparation method as that of the binder particle dispersion liquid CP-2, except that the kinds and the ratios (contents) of the polymerizable compound and the copolymerizable compound were changed as shown in Table 1 below.

(Preparation of Binder Particle Dispersion Liquid CP-5 Formed of (Meth)Acrylic Resin)

400 parts by mass of heptane, 100 parts by mass of decyl methacrylate (manufactured by Wako Pure Chemical Industries, Ltd.), and 1 parts by mass of methacrylic acid (manufactured by Wako Pure Chemical Industries, Ltd.) were added to a 1 L three-neck flask equipped with a reflux cooling pipe and a gas introduction coke, nitrogen gas was introduced at a flow rate of 200 mL/min for 10 minutes, and the solution was heated to 80° C. A liquid (a solution in which 20 parts by mass of a radical polymerization initiator V-601 (trade name, manufactured by Wako Pure Chemical Industries, Ltd.) and 400 parts by mass of heptane were mixed with each other) prepared in a separate container was added dropwise to the solution for 2 hours and was stirred at 80° C. for 2 hours. Next, the obtained polymer solution was put into 2000 parts by mass of methanol, and a precipitated polymer was dried under reduced pressure at 60° C. for 2 hours. The obtained polymer was dissolved in toluene, 10 parts by mass of glycidyl methacrylate (manufactured by Wako Pure Chemical Industries, Ltd.) was added thereto, the solution was stirred at 90° C. for 5 hours, and carboxylic acid derived methacrylic acid and a glycidyl group were caused to react with each other. As a result, M-1 was obtained.

Next, 400 parts by mass of heptane and 100 parts by mass of M-1 (expressed in terms of solid contents) synthesized as described above were added to a 1 L three-neck flask equipped with a reflux cooling pipe and a gas introduction coke, nitrogen gas was introduced at a flow rate of 200 mL/min for 10 minutes, and the solution was heated to 80° C. A liquid (a solution in which 580 parts by mass of methacrylic acid (manufactured by Wako Pure Chemical Industries, Ltd.), 320 parts by mass of methyl methacrylate (manufactured by Wako Pure Chemical Industries, Ltd.), 5 parts by mass of a radical polymerization initiator V-601 (trade name, manufactured by Wako Pure Chemical Industries, Ltd.), and 400 parts by mass of heptane were mixed with each other) prepared in a separate container was added dropwise to the solution for 2 hours and was stirred at 80° C. for 2 hours. The obtained solution was cooled to room temperature, and a binder particle dispersion liquid CP-5 was obtained.

The solid content concentration (mass %) of the obtained binder particle dispersion liquid and the average particle size of the binder particles are shown in Table 1. In addition, the weight-average molecular weight and the glass transition point (Tg) of the polymer forming the binder particles were calculated, and the results are shown in Table 1. Further, the molecular weight and the SP value of the (co)polymerizable compound forming the polymer were measured or calculated, and the results are shown in Table 1. In order to calculate the SP value, not only a monomer structure but also a structure in which the compound was incorporated into the polymer was calculated.

<Method of Measuring Solid Content Concentration>

The solid content concentration of the binder particle dispersion liquid was measured based on the following method.

About 1.5 g of the binder particle dispersion liquid was weighed in an aluminum cup having a diameter ϕ of 7 cm, and the weighed value was read up to the three decimal places. Next, the solution was heated and dried in a nitrogen atmosphere at 90° C. for 2 hours and at 140° C. for 2 hours. The weight of the residue in the obtained aluminum cup was measured, and the solid content concentration was calculated from the following expression. The measurement was performed five times, and the average value of three measured values other than the maximum value and the minimum value were adopted.

Solid Content Concentration (%)=Amount (g) of Residue in Aluminum Cup/Binder Particle Dispersion Liquid or Macromonomer Solution (g)

<Measurement of Average Particle Size of Binder Particles>

The average particle size of the binder particles was measured in the following order. A dry sample of the binder particle dispersion liquid prepared as described above was dispersed using an appropriate solvent (a dispersion medium used for preparing the solid electrolyte composition; heptane in the case of the binder particles P-1) to prepare a 1 mass % of a dispersion liquid. This dispersion liquid sample was irradiated with 1 kHz ultrasonic waves for 10 minutes, and the volume average particle size of the resin particles was measured using a laser diffraction/scattering particle size distribution analyzer LA-920 (trade name, manufactured by Horiba Ltd.).

<Measurement of Weight-Average Molecular Weight>

The weight-average molecular weight of the polymer forming the binder particles was measured using the above-described method (condition 2).

<Measurement Method of Glass Transition Point (Tg)>

The glass transition point (Tg) of the polymer forming the binder particles was measured using the above-described method.

<Method of Calculating SP Value>

The SP value ($cal^{1/2}$ $cm^{-3/2}$) of the (co)polymerizable compound was calculated using the above-described method.

TABLE 1

| Dispersion Liquid | Polymerizable Compound | | | | | Copolymerizable Compound |
|---|---|---|---|---|---|---|
| | Compound Name | Molecular Weight | Structure (*1) | SP Value | Content (mass%) | Compound Name |
| P-1 | Lauryl Methacrylate | 254.4 | 12 | 9.0 | 25 | HEA/MMA/MAA |
| P-2 | Lauryl Methacrylate | 254.4 | 12 | 9.0 | 25 | HEA/MMA/MAA |
| P-3 | Lauryl Methacrylate | 254.4 | 12 | 9.0 | 25 | HEA/MMA/MAA |
| P-4 | Stearyl Methacrylate | 338.6 | 18 | 9.0 | 30 | MEEA/MAA |
| P-5 | Stearyl Methacrylate | 338.6 | 18 | 9.0 | 40 | GMA/AA |
| P-6 | Stearyl Methacrylate | 338.6 | 18 | 9.0 | 25 | HEA/AN/β-CEA |
| P-7 | A-1 | 484.6 | 16 | 10.3 | 50 | DMAA/MMA |
| P-8 | A-1 | 484.6 | 16 | 10.3 | 40 | HMAA/AA |
| P-9 | A-1 | 484.6 | 16 | 10.3 | 50 | MMI/β-CEA |
| P-10 | A-2 | 283.4 | 11 | 10.1 | 30 | AN/MMA/MAA |
| P-11 | X22-174ASX | 900 | Siloxane | 8.6 (*3) | 25 | HEA/AN/β-CEA |
| P-12 | 1,2-Dodecanediol | 202.34 | 10 | 9.3 | 45 | MDI |
| P-13 | Lauryl Methacrylate | 254.4 | 12 | 9.0 | 60 | HEA/MMA/MAA |
| CP-1 | MKF-2012 | Higher than 4,600 | Siloxane | 8.6 (*3) | 10 | MA/MMA |
| CP-2 | Nonylphenoxy Polyethylene Glycol Acrylate | 450.6 | 9 | 9.9 | 53 | MMA/St/DVB |
| CP-3 | 2-Ethylhexyl Acrylate | 184.3 | 8 | 9.1 | 53 | MMA/St/DVB |
| CP-4 | 2-Ethylhexyl Acrylate | 184.3 | 8 | 9.1 | 50 | MMI/β-CEA |
| CP-5 | M-1 | 2,000 | 10 | 9.0 | 10 | MA/MMA |

| Dispersion Liquid | Copolymerizable Compound | | Tg | Average Molecular Weight | Average Particle Size (nm) | Dispersion Medium (*2) | Solid Content Concentration |
|---|---|---|---|---|---|---|---|
| | SP Value | Content (mass %) | | | | | |
| P-1 | 12.6/9.5/9.3 | 5/65/5 | 35 | 53,000 | 330 | Heptane | 25 |
| P-2 | 12.6/9.5/9.3 | 20/50/5 | 20 | 60,000 | 300 | Heptane | 25 |
| P-3 | 12.6/9.5/9.3 | 50/20/5 | −8 | 58,000 | 270 | Heptane | 25 |
| P-4 | 10.2/9.3 | 60/10 | −55 | 32,000 | 340 | Octane | 25 |
| P-5 | 10.8/10.0 | 30/30 | −20 | 43,000 | 300 | Octane | 25 |
| P-6 | 12.6/12.3/10.5 | 50/20/5 | −29 | 28,000 | 200 | Octane | 25 |
| P-7 | 11.8/9.5 | 25/25 | 5 | 112,000 | 130 | Heptane | 25 |
| P-8 | 15.7/10.0 | 50/10 | −25 | 101,000 | 80 | Heptane | 25 |
| P-9 | 14.2/10.5 | 40/10 | 18 | 84,000 | 100 | Octane | 25 |
| P-10 | 12.3/9.5/9.3 | 20/40/10 | 48 | 65,000 | 400 | Heptane | 25 |
| P-11 | 12.6/12.3/10.5 | 60/10/5 | −20 | 23,000 | 420 | Heptane | 25 |
| P-12 | 13.2 | 55 | 35 | 8,600 | 600 | Octane | 26 |
| P-13 | 12.6/9.5/9.3 | 25/10/5 | −35 | 67,000 | 200 | Heptane | 24 |
| CP-1 | 10.0/9.5 | 58/32 | 44 | 35,000 | 200 | Heptane | 25 |
| CP-2 | 9.5/9.4/10.0 | 26/20/1 | 102 | Not Measurable | 180 | Water → Decalin | 5 |

TABLE 1-continued

| | | | | | | | | |
|---|---|---|---|---|---|---|---|---|
| CP-3 | 9.5/9.4/10.0 | 26/20/1 | 3 | Not Measurable | 1,200 | Water → Decalin | 5 |
| CP-4 | 14.2/10.5 | 30/20 | 10 | Not Measurable | 300 | Water → Decalin | 5 |
| CP-5 | 10.0/9.5 | 58/32 | 40 | 31,000 | 320 | Heptane | 20 |

(*1) In "Structure", in the case of aliphatic hydrocarbon chain, the number of carbon atoms thereof is shown, and in the case of a siloxane structure, "Siloxane" is shown.
(*2) In "Dispersion Medium", "Water → Decalin" represents that water was substituted with decalin after polymerization of the polymer in water.
(*3) A reference value. The calculated value of Si cannot be referred to.

<Notes in Table>
A-1: a polymerizable compound described below
A-2: a polymerizable compound described below
X22-174ASX: single-end type methacryl-modified dimethyl siloxane (manufactured by Shin-Etsu Chemical Co., Ltd.) described below
MKF-2012: single-end type methacryl-modified dimethyl siloxane (manufactured by Shin-Etsu Chemical Co., Ltd.)
M-1: the polymerizable compound described in the above-described synthesis example
HEA: hydroxyethyl acrylate
MMA: methyl methacrylate
MAA: methacrylic acid
MA: methyl acrylate
MEEA: methoxy ethyl acrylate
GMA: glycidyl methacrylate
AA: acrylic acid
DMAA: dimethylacrylamide
HMAA: hydroxymethylacrylamide
MMI: N-methylmaleimide
AN: acrylonitrile β-CEA; β-carboxyethyl acrylate
St: styrene
DVB: divinylbenzene
MDI: methylene diphenyl diisocyanate

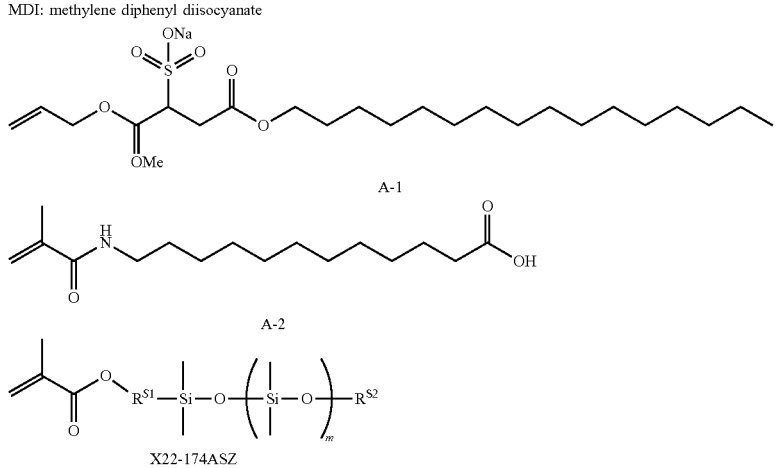

<Synthesis of Sulfide-Based Inorganic Solid Electrolyte>

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphoruspentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by Fritsch Japan Co., Ltd.), the full amount of the mixture of the lithium sulfide and the diphosphoruspentasulfide was put thereinto, and the container was completely sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li/P/S-based glass; hereinafter, referred to as LPS) was obtained.

<Preparation Example of Solid Electrolyte Composition>

(Preparation of Solid Electrolyte Composition S-1)

180 zirconia beads having a diameter of 5 mm were put into a 45 mL zirconia container (manufactured by Fritsch Japan Co., Ltd.), and 9.5 g of LPS synthesized as described above and 12.3 g of heptane as a dispersion medium were put thereinto. Next, 0.5 g (corresponding to the solid content) of the binder particle dispersion liquid P-1 was put into the container, and the container was set in a planetary ball mill P-7 (trade name, manufactured by Fritsch Japan Co., Ltd.). The components were mixed at a temperature of 25° C. and a rotation speed of 300 rpm for 2 hours. As a result, a solid electrolyte composition S-1 was prepared.

(Preparation of Solid Electrolyte Compositions S-2 to S-15 and T-1 to T-6)

Solid electrolyte compositions S-2 to S-15 and T-1 to T-6 were prepared using the same preparation method as that of the solid electrolyte composition S-1, except that the kinds and the amounts (contents) of the solid electrolyte, the binder particle dispersion liquid, and the dispersion medium were changed as shown in Table 2 below.

TABLE 2

| Solid Electrolyte Composition | Inorganic Solid Electrolyte Kind | Content (*1) | Binder Particle Dispersion Liquid Kind | Content (*1) | Dispersion Liquid | Note |
|---|---|---|---|---|---|---|
| S-1 | LPS | 95 | P-1 | 5 | Heptane | Present Invention |
| S-2 | LPS | 95 | P-2 | 5 | Heptane | Present Invention |
| S-3 | LPS | 95 | P-3 | 5 | Heptane | Present Invention |
| S-4 | LPS | 95 | P-4 | 5 | Octane | Present Invention |
| S-5 | LPS | 95 | P-5 | 5 | Octane | Present Invention |
| S-6 | LPS | 95 | P-6 | 5 | Octane | Present Invention |
| S-7 | LPS | 95 | P-7 | 5 | Heptane | Present Invention |
| S-8 | LPS | 95 | P-8 | 5 | Heptane | Present Invention |
| S-9 | LPS | 95 | P-9 | 5 | Octane | Present Invention |
| S-10 | LPS | 95 | P-10 | 5 | Heptane | Present Invention |
| S-11 | LPS | 95 | P-11 | 5 | Heptane | Present Invention |
| S-12 | LPS | 95 | P-12 | 5 | Octane | Present Invention |
| S-13 | LLZ | 90 | P-1 | 10 | Heptane | Present Invention |
| S-14 | LLZ | 90 | P-8 | 10 | Heptane | Present Invention |
| S-15 | LPS | 95 | P-13 | 5 | Heptane | Present Invention |
| T-1 | LPS | 95 | CP-1 | 5 | Heptane | Comparative Example |
| T-2 | LPS | 95 | CP-2 | 5 | Toluene | Comparative Example |
| T-3 | LPS | 95 | CP-3 | 5 | Toluene | Comparative Example |
| T-4 | LLZ | 90 | CP-1 | 10 | Heptane | Comparative Example |
| T-5 | LPS | 95 | CP-4 | 5 | Toluene | Comparative Example |
| T-6 | LPS | 95 | CP-5 | 5 | Heptane | Comparative Example |

(*1) The content represents the content (mass %) in terms of solid contents.
<Notes in Table>
LPS: sulfide-based inorganic solid electrolyte synthesized as described above
LLZ: oxide-based inorganic solid electrolyte $Li_7La_3Zr_2O_{12}$ (manufactured by Toshima Manufacturing Co., Ltd.)

<Preparation of Electrode Sheet for all-Solid State Secondary Battery>

(Preparation of Positive Electrode Sheet C-1 for all-Solid State Secondary Battery)

180 zirconia beads having a diameter of 5 mm were put into a 45 mL zirconia container (manufactured by Fritsch Japan Co., Ltd.), and 1.9 g (corresponding to the solid content) of the solid electrolyte composition S-1 prepared as described above and 12.3 g of heptane as the total amount of the dispersion medium were put thereinto. Further, 8.0 g of $LiNi_{0.85}Co_{0.10}Al_{0.05}O_2$ (NCA) as a positive electrode active material and 0.1 g of acetylene black were put thereinto. Next, the container was continuously set in a planetary ball mill P-7 and the components were mixed together at a temperature of 25° C. and a rotation speed of 200 rpm for 30 minutes. This way, a positive electrode composition (slurry) C-1C was prepared.

The positive electrode composition C-1C prepared as described above was applied to an aluminum foil as a current collector having a thickness of 20 μm using a Baker Type applicator (trade name: SA-201, manufactured by Tester Sangyo Co., Ltd.), and was heated at 80° C. for 1 hour and heated at 110° C. for 1 hour to dry the positive electrode composition C-1C. Next, the dried positive electrode layer composition C-1C was pressurized (20 MPa, 1 minute) while being heated (120° C.) using a heat press machine. As a result, a positive electrode sheet C-1 for an all-solid state secondary battery having a laminate structure of positive electrode active material layer (the thickness is shown in Table 4)/aluminum foil was prepared.

(Preparation of Positive Electrode Sheets C-2 to C-15 and CC-1 to CC-6 for all-Solid State Secondary Battery)

Positive electrode sheets C-2 to C-15 and CC-1 to CC-6 for an all-solid state secondary battery were prepared using the same preparation method as that of the positive electrode sheet C-1 for an all-solid state secondary battery, except that the kinds and the amounts (contents) of the solid electrolyte composition, the active material, the conductive auxiliary agent, and the dispersion medium were changed as shown in Table 3 below.

(Preparation of Negative Electrode Sheet A-1 for all-Solid State Secondary Battery)

180 zirconia beads having a diameter of 5 mm were put into a 45 mL zirconia container (manufactured by Fritsch Japan Co., Ltd.), and 5.0 g (corresponding to the solid content) of the solid electrolyte composition S-3 prepared as described above and 12.3 g of heptane as the dispersion medium were put thereinto. Next, the container was set in a planetary ball mill P-7 (trade name, manufactured by Fritsch Japan Co., Ltd.), and the components were stirred for 2 hours at a temperature of 25° C. and a rotation speed of 300 rpm. Next, 5.0 g of graphite as a negative electrode active material shown in Table 3 was put into the container, the container was set in a planetary ball mill P-7 again, and the components were continuously mixed at a temperature of 25° C. and a rotation speed of 100 rpm for 15 minutes. This way, a negative electrode layer composition (slurry) A-1C was obtained.

The negative electrode layer composition A-1C obtained as described above was applied to a stainless steel foil having a thickness of 10 μm using the Baker Type applicator and was heated at 80° C. for 2 hours to dry the negative electrode layer composition A-1C. Next, the dried negative electrode layer composition A-1C was pressurized (600 MPa, 1 minute) while being heated (120° C.) using a heat press machine. As a result, a negative electrode sheet A-1 for an all-solid state secondary battery having a laminate structure of negative electrode active material layer (the thickness is shown in Table 4)/stainless steel foil was prepared.

(Preparation of Negative Electrode Sheets A-2 to A-4 and CA-1 and CA-2 for All-Solid State Secondary Battery)

Positive electrode sheets A-2 to A-4 and CA-1 and CA-2 for an all-solid state secondary battery were prepared using the same preparation method as that of the negative electrode sheet A-1 for an all-solid state secondary battery, except that the kinds and the amounts (contents) of the solid electrolyte composition, the active material, the conductive auxiliary agent, and the dispersion medium were changed as shown in Table 3 below.

<Stability Test of Positive Electrode Layer Composition and Negative Electrode Layer Composition>

A part of each of the compositions prepared as described above was separated from the planetary ball mill P-7, and a transparent glass tube having a diameter of 10 mm was charged with the separated composition up to a height of 3 cm. The glass tube was left to stand at 25° C. for 1 hour. Next, the phase separation state of the composition and the degree of phase separation were determined based on the following evaluation standards. In this test, an evaluation standard of "C" or higher is an acceptable level.

—Evaluation Standards—

A: layer separation did not occur in the composition (slurry)

B: a portion (supernatant layer) where layer separation occurred was at a distance of less than 3 mm from the liquid level C: a portion (supernatant layer) where layer separation occurred was at a distance of more than 3 mm and less than 10 mm from the liquid level D: a portion (supernatant layer) where layer separation occurred was at a distance of more than 10 mm and less than 20 mm from the liquid level E: a portion (supernatant layer) where layer separation occurred was at a distance of 20 mm or more from the liquid level <Test for Binding Properties of Electrode Sheet for all-Solid State Secondary Battery>

As a test for binding properties of the positive electrode sheet for an all-solid state secondary battery and the negative electrode sheet for an all-solid state secondary battery, a test for the flexibility of each of the sheets, that is, a bending resistance test using a mandrel tester (according to JIS K5600-5-1) was performed for evaluation. Specifically, a strip-shaped specimen having a width of 50 mm and a length of 100 mm was cut out from each of the sheets. This specimen was set such that the active material layer surface was opposite to the mandrel (the current collector faced mandrel side) and the width direction of the specimen was parallel to the axis of the mandrel. Next, the specimen was bent by 180° (once) along the outer circumferential surface of the mandrel, and whether or not cracking or fracturing occurred in the active material layer was observed. The bending test was performed using a mandrel having a diameter of 32 mm. In a case where cracking and fracturing did not occur, the diameter of the mandrel (unit mm) was gradually reduced to 25, 20, 16, 12, 10, 8, 6, 5, 4, 3, and 2, and the diameter of the mandrel at which cracking and/or fracturing occurred was recorded. Binding properties were evaluated based on one of the following evaluation standards in which the diameter (defect occurrence diameter) at which cracking or fracturing occurred was included. In the present invention, as the defect occurrence diameter decreases, the binding properties of the solid particles become stronger, and an evaluation standard "C" or higher is an acceptable level.

—Evaluation Standards—

A: 5 mm or less
B: 6 mm or 8 mm
C: 10 mm
D: 12 mm or 16 mm
E: 20 mm or 25 mm
F: 32 mm

TABLE 3

| Electrode Sheet | Active Material Kind | Content (*1) | Solid Electrolyte Composition Kind | Content (*2) | Conductive Auxiliary Agent Kind | Content (*1) | Dispersion Liquid | Stability Test | Binding Property Test | Note |
|---|---|---|---|---|---|---|---|---|---|---|
| C-1 | NCA | 80 | S-1 | 19 | AB | 1 | Heptane | C | C | Present Invention |
| C-2 | NCA | 80 | S-2 | 19 | AB | 1 | Heptane | B | B | Present Invention |
| C-3 | NCA | 80 | S-3 | 19 | VGCF | 1 | Heptane | A | A | Present Invention |
| C-4 | LCO | 80 | S-4 | 19 | VGCF | 1 | Octane | C | C | Present Invention |
| C-5 | LCO | 80 | S-5 | 19 | AB | 1 | Octane | A | A | Present Invention |
| C-6 | NMC | 80 | S-6 | 19 | AB | 1 | Octane | A | A | Present Invention |
| C-7 | NMC | 80 | S-7 | 19 | VGCF | 1 | Heptane | A | A | Present Invention |
| C-8 | NMC | 80 | S-8 | 19 | VGCF | 1 | Heptane | A | A | Present Invention |
| C-9 | NMC | 80 | S-9 | 19 | AB | 1 | Octane | B | B | Present Invention |
| C-10 | NMC | 80 | S-10 | 19 | AB | 1 | Heptane | C | C | Present Invention |
| C-11 | NCA | 80 | 5-11 | 19 | VGCF | 1 | Heptane | C | C | Present Invention |
| C-12 | LCO | 80 | S-12 | 19 | VGCF | 1 | Octane | C | C | Present Invention |
| C-13 | NMC | 80 | S-13 | 19 | AB | 1 | Heptane | C | C | Present Invention |
| C-14 | NMC | 80 | S-14 | 19 | AB | 1 | Heptane | C | C | Present Invention |
| C-15 | NCA | 80 | S-15 | 19 | VGCF | 1 | Heptane | A | B | Present Invention |
| A-1 | Graphite | 50 | S-3 | 50 | — | — | Heptane | A | B | Present Invention |
| A-2 | Graphite | 50 | S-6 | 50 | — | — | Octane | A | B | Present Invention |
| A-3 | Si | 30 | S-3 | 60 | AB | 10 | Heptane | C | C | Present Invention |

TABLE 3-continued

| Electrode Sheet | Active Material Kind | Content (*1) | Solid Electrolyte Composition Kind | Content (*2) | Conductive Auxiliary Agent Kind | Content (*1) | Dispersion Liquid | Stability Test | Binding Property Test | Note |
|---|---|---|---|---|---|---|---|---|---|---|
| A-4 | Si | 30 | S-6 | 60 | AB | 10 | Octane | C | C | Present Invention |
| CC-1 | NCA | 80 | T-1 | 19 | VGCF | 1 | Heptane | E | E | Comparative Example |
| CC-2 | LCO | 80 | T-2 | 19 | VGCF | 1 | Toluene | D | E | Comparative Example |
| CC-3 | NMC | 80 | T-3 | 19 | AB | 1 | Toluene | D | F | Comparative Example |
| CC-4 | NMC | 80 | T-4 | 19 | AB | 1 | Heptane | D | F | Comparative Example |
| CC-5 | LCO | 80 | T-5 | 19 | VGCF | 1 | Toluene | D | E | Comparative Example |
| CC-6 | NMC | 80 | T-6 | 19 | AB | 1 | Heptane | D | D | Comparative Example |
| CA-1 | Graphite | 50 | T-2 | 50 | — | — | Toluene | D | E | Comparative Example |
| CA-2 | Si | 30 | T-3 | 60 | AB | 10 | Toluene | E | F | Comparative Example |

(*1) The unit of the content is mass %.
(*2) The content represents the content (mass %) in terms of solid contents.
<Notes in Table>
NCA: $LiNi_{0.85}Co_{0.10}Al_{0.05}O_2$ (manufactured by Sigma-Aldrich Corporation)
LCO: $LiCoO_2$ (manufactured by Sigma-Aldrich Corporation)
NMC: $LiNi_{1/3}Co_{1/3}Mn_{1/3}O_2$ (manufactured by Sigma-Aldrich Corporation)
Si: silicon powder
AB: acetylene black (DENKA BLACK (trade name) manufactured by Denka Co., Ltd.)
VGCF: vapor-grown carbon fiber (manufactured by Showa Denko K.K.)

As can be seen from the results shown in Table 3, in the solid electrolyte composition not including the binder particles defined by the present invention, the dispersion stability was not sufficient. Further, in the positive electrode sheets CC-1 to CC-6 for an all-solid state secondary battery and the negative electrode sheets CA-1 and CA-2 for an all-solid state secondary battery formed of the solid electrolyte composition, the binding properties of the solid particles were poor.

On the other hand, in the solid electrolyte composition including the binder particles defined by the present invention, the dispersion stability was high. Further, in the positive electrode sheets C-1 to C-15 for an all-solid state secondary battery and the negative electrode sheets A-1 to A-4 for an all-solid state secondary battery formed of the solid electrolyte composition, the solid particles were strongly bonded to each other.

Example 2

Figure 2:
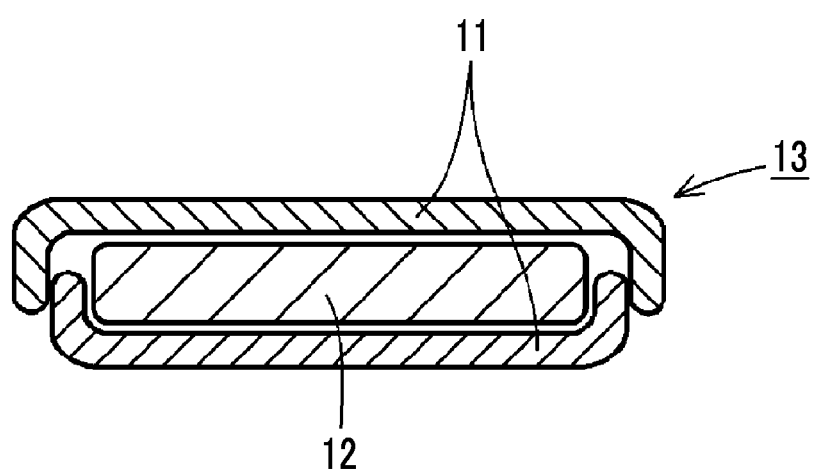
FIG. 2 is a vertical cross-sectional view schematically illustrating an all-solid state secondary battery (coin battery) prepared in Examples.

In Example 2, an all-solid state secondary battery shown in FIG. 2 having a layer configuration shown in FIG. 1 was manufactured, and the battery performance thereof was evaluated. The results are shown in Table 4.

<Manufacturing of all-Solid State Secondary Battery 101>

Using the negative electrode sheet A-1 for an all-solid state secondary battery prepared in Example 1, a bending test using a mandrel having a diameter of 10 mm was performed three times as in <Test for Binding Properties of Electrode Sheet for All-Solid State Secondary Battery> of Example 1. Next, the solid electrolyte composition S-1 prepared in Example 1 was applied to the negative electrode active material layer using the Baker Type applicator, was heated at 80° C. for 1 hour and further heated at 110° C. for 6 hours to dry the solid electrolyte composition S-1. Next, the negative electrode sheet A-1 in which the solid electrolyte layer (applied and dried layer) was formed on the negative electrode active material layer was pressurized (30 MPa, 1 minute) while being heated (120° C.) using a heat press machine. As a result, the negative electrode sheet having a laminate structure of solid electrolyte layer/negative electrode active material layer/stainless steel foil was prepared.

This negative electrode sheet was cut in a circular plate shape having a diameter of 15 mm. On the other hand, using the positive electrode sheet C-1 for an all-solid state secondary battery prepared in Example 1, a bending test using a mandrel having a diameter of 10 mm was performed three times as in <Test for Binding Properties of Electrode Sheet for All-Solid State Secondary Battery> of Example 1. Next, this sheet was cut in a circular plate shape having a diameter of 13 mm. The positive electrode active material layer of the positive electrode sheet C-1 for an all-solid state secondary battery and the solid electrolyte layer formed in the negative electrode sheet A-1 were disposed (laminated) to face each other. Next, the sheet was pressurized (40 MPa, 1 minute) while being heated (120° C.) using a heat press machine. As a result, a laminate for an all-solid state secondary battery having a laminate structure of aluminum foil/positive electrode active material layer/solid electrolyte layer/negative electrode active material layer/stainless steel foil was prepared.

Next, a laminate 12 for an all-solid state secondary battery prepared as described above was put into a 2032-type coin case 11 formed of stainless steel equipped with a spacer and a washer (not shown in FIG. 2), and the 2032-type coin case 11 was swaged. As a result, an all-solid state secondary battery 101 represented by reference numeral 13 in FIG. 2 was prepared.

<Manufacturing of all-Solid State Secondary Batteries 102 to 116 and c01 to c06>

All-solid state secondary batteries 102 to 116 and c01 to c06 were manufactured using the same manufacturing method as that of the all-solid state secondary battery 101, except that the positive electrode sheet for an all-solid state secondary battery (positive electrode active material layer), the solid electrolyte composition, and the negative electrode sheet for an all-solid state secondary battery (negative electrode active material layer) were changed as shown in Table 4 below.

Regarding each of the electrode sheets manufactured in Example 1, and the solid electrolyte layer formed as described above, the weight per unit area and the thickness are shown in Table 4.

<Battery Performance Test after Bending>

(Resistance Test)

The battery voltage of the all-solid state secondary battery manufactured as described above was measured using a charging and discharging evaluation device "TOSCAT-3000" (trade name; manufactured by Toyo System Corporation). The all-solid state secondary battery was charged at a current value of 0.2 mA until the battery voltage reached 4.2 V, and then was discharged at a current value of 2.0 mA until the battery voltage reached 3.0 V. After 10 seconds from the start of discharging, the battery voltage was read, and the resistance was evaluated based on one of the following evaluation standards in which the read battery voltage was included. As the battery voltage increases, the resistance decreases. The evaluation standards are as follows. In this test, an evaluation standard of "C" or higher is an acceptable level.

—Evaluation Standards—

A: 4.1 V or higher

B: 4.0 V or higher and lower than 4.1 V

C: 3.8 V or higher and lower than 4.0 V

D: 3.6 V or higher and lower than 3.8 V

E: lower than 3.6 V (Measurement of Discharge Capacity)

The discharge capacity of the all-solid state secondary battery manufactured as described above was measured using a charging and discharging evaluation device "TOSCAT-3000" (trade name; manufactured by Toyo System Corporation). The all-solid state secondary battery was charged at a current value of 0.2 mA until the battery voltage reached 4.2 V, and then was discharged at a current value of 0.2 mA until the battery voltage reached 3.0 V. This charging and discharging operation was set as one cycle and was repeated. During this charging and discharging cycle, the discharge capacity of the third cycle was obtained. This discharge capacity was converted into a value per 100 cm$^2$ of the surface area of the positive electrode active material layer, and this converted value was set as the discharge capacity of the all-solid state secondary battery. Regarding the discharge capacity of the all-solid state secondary battery, 110 mAh or higher is an acceptable level.

TABLE 4

| All-Solid State Secondary Battery | Positive Electrode Active Material Layer | | | Solid Electrolyte Layer | | | Negative Electrode Active Material Layer | | | Battery Performance Test after Bending | | Note |
|---|---|---|---|---|---|---|---|---|---|---|---|---|
| | Kind | Weight per Unit Area (mg/cm$^2$) | Thickness (μm) | Kind | Weight per Unit Area (mg/cm$^2$) | Thickness (μm) | Kind | Weight per Unit Area (mg/cm$^2$) | Thickness (μm) | Resistance Test | Discharge Capacity (mAh) | |
| 101 | C-1 | 20 | 60 | S-1 | 10 | 52 | A-1 | 20 | 120 | c | 152 | Present |
| 102 | C-2 | 20 | 59 | S-2 | 10 | 50 | A-1 | 20 | 120 | B | 179 | Present |
| 103 | C-3 | 20 | 56 | S-3 | 10 | 48 | A-1 | 20 | 120 | A | 206 | Present |
| 104 | C-4 | 20 | 62 | S-4 | 10 | 55 | A-1 | 20 | 120 | c | 152 | Present |
| 105 | C-5 | 20 | 60 | 5-5 | 10 | 51 | A-1 | 20 | 120 | A | 199 | Present |
| 106 | C-6 | 20 | 55 | S-6 | 10 | 47 | A-1 | 20 | 120 | A | 211 | Present |
| 107 | C-7 | 20 | 58 | S-7 | 10 | 49 | A-1 | 20 | 120 | A | 197 | Present |
| 108 | C-8 | 20 | 57 | S-8 | 10 | 50 | A-2 | 20 | 118 | A | 202 | Present |
| 109 | C-9 | 20 | 60 | S-9 | 10 | 52 | A-2 | 20 | 118 | B | 175 | Present |
| 110 | C-10 | 20 | 62 | S-10 | 10 | 53 | A-2 | 20 | 118 | C | 155 | Present |
| 111 | C-11 | 20 | 63 | S-11 | 10 | 52 | A-2 | 20 | 118 | C | 146 | Present |
| 112 | C-12 | 20 | 63 | S-12 | 10 | 53 | A-2 | 20 | 118 | C | 139 | Present |
| 113 | C-13 | 20 | 72 | S-13 | 50 | 150 | A-2 | 20 | 118 | C | 121 | Present |
| 114 | C-14 | 20 | 75 | S-14 | 50 | 150 | A-2 | 20 | 118 | C | 116 | Present |
| 115 | C-3 | 20 | 56 | T-1 | 10 | 50 | CA-1 | 20 | 126 | C | 160 | Present |
| 116 | C-15 | 20 | 56 | S-15 | 10 | 53 | A-1 | 20 | 120 | B | 190 | Present |
| c01 | CC-1 | 20 | 61 | T-1 | 10 | 50 | CA-1 | 20 | 126 | E | 98 | Comparative Example |
| c02 | CC-2 | 20 | 60 | T-2 | 10 | 52 | CA-1 | 20 | 126 | E | 108 | Comparative Example |
| c03 | CC-3 | 20 | 60 | T-3 | 10 | 52 | CA-1 | 20 | 126 | E | 105 | Comparative Example |
| c04 | CC-4 | 20 | 76 | T-4 | 50 | 150 | CA-1 | 20 | 126 | E | 80 | Comparative Example |
| c05 | CC-5 | 20 | 60 | T-5 | 10 | 50 | CA-1 | 20 | 126 | E | 105 | Comparative Example |
| c06 | CC-6 | 20 | 60 | T-6 | 10 | 51 | CA-1 | 20 | 126 | E | 105 | Comparative Example |

As can be seen from the result shown in Table 4, in the all-solid state secondary batteries c01 to c06 in which the layers formed of the solid electrolyte composition not including the binder particles defined by the present invention were provided as the electrode layer and the solid electrolyte layer, the resistance was high, the discharge capacity low, and the battery performance was not sufficient. The reason for this is presumed that the binding properties of the solid particles were not sufficient and cracking or fracturing occurred in the electrode layer or the solid electrolyte layer.

On the other hand, in the all-solid state secondary batteries 101 to 116 in which the layer formed of the solid electrolyte composition including the binder particles defined by the present invention was provided as at least one the electrode layer or the solid electrolyte layer, even in a case where bending stress was applied to the electrode sheet, the resistance was low and the discharge capacity was also high. This way, in the all-solid state secondary battery according to the embodiment of the present invention, the solid particles are strongly bonded to each other, and cracking or fracturing caused by bending stress did not occur in the constituent layer in the all-solid state secondary battery. Therefore, even in a case where bending stress is applied, the battery performance can be maintained.

Explanation of References
- 1: negative electrode current collector
- 2: negative electrode active material layer
- 3: solid electrolyte layer
- 4: positive electrode active material layer
- 5: positive electrode current collector
- 6: operation portion
- 10: all-solid state secondary battery
- 11: coin case
- 12: laminate for all-solid state secondary battery
- 13: cell (coin battery) for ion conductivity measurement

What is claimed is:

1. A solid electrolyte composition comprising:
    an inorganic solid electrolyte having ion conductivity of a metal belonging to Group 1 or Group 2 in the periodic table;
    binder particles having an average particle size of 1 nm to 400 nm; and
    a dispersion medium,
    wherein the binder particles include a polymer that includes a component derived from a polymerizable compound having a molecular weight of lower than 1,000, and
    the component includes at least one of an aliphatic hydrocarbon chain to which 10 or more carbon atoms are bonded or a siloxane structure as a side chain of the polymer,
    the component derived from the polymerizable compound having a molecular weight of lower than 1,000 is incorporated into at least a main chain of the polymer through a binding mode in which the aliphatic hydrocarbon chain or the siloxane structure is the side chain of the polymer,
    wherein the polymer includes a component having a SP value of 10.5 ($\text{cal}^{1/2}$ $\text{cm}^{-3/2}$) or higher.

2. The solid electrolyte composition according to claim 1, wherein a content of the component derived from the polymerizable compound with respect to the polymer is 0.1 to 70 mass %.

3. The solid electrolyte composition according to claim 1, wherein a glass transition temperature of the polymer is 30° C. or lower.

4. The solid electrolyte composition according to claim 1, wherein the aliphatic hydrocarbon chain is linear.

5. The solid electrolyte composition according to claim 1, wherein the component derived from the polymerizable compound has at least one chain structure represented by the following Formula (HC) as the aliphatic hydrocarbon chain, $$\left(\begin{array}{c} R^1 \\ | \\ C \\ | \\ R^2 \end{array}\right)_n \quad \text{Formula (HC)}$$

where in Formula (HC), $R^1$ and $R^2$ each independently represent a hydrogen atom, a halogen atom, a cyano group, an alkyl group, an alkoxy group, or an aryl group, and
n represents an integer of 10 or more.

6. The solid electrolyte composition according to claim 1, wherein the polymer includes at least one functional group selected from the group consisting of an acidic functional group, a basic functional group, a hydroxy group, a cyano group, an alkoxysilyl group, an aryl group, a heteroaryl group, and a hydrocarbon ring group in which three or more rings are fused.

7. The solid electrolyte composition according to claim 1, wherein the inorganic solid electrolyte is a sulfide-based inorganic solid electrolyte.

8. The solid electrolyte composition according to claim 1, further comprising:
    an active material.

9. An electrode sheet for an all-solid state battery comprising an active material layer that is formed of the solid electrolyte composition according to claim 8.

10. The solid electrolyte composition according to claim 1,
    wherein a content of the component derived from the polymerizable compound with respect to the polymer is 0.5 to 50 mass %.

11. A sheet for an all-solid state battery comprising a layer that is formed of the solid electrolyte composition according to claim 1.

12. An all-solid state secondary battery comprising a positive electrode active material layer, a solid electrolyte layer, and a negative electrode active material layer in this order,
    wherein at least one of the positive electrode active material layer, the solid electrolyte layer, or the negative electrode active material layer is formed of the solid electrolyte composition according to claim 1.

13. A method of manufacturing a sheet for an all-solid state secondary battery comprising forming a film using the solid electrolyte composition according to claim 1.

14. A method of manufacturing an all-solid state secondary battery comprising manufacturing a sheet for an all-solid state secondary battery using the method according to claim 13.

* * * * *